United States Patent
Frederick et al.

(10) Patent No.: US 9,067,168 B2
(45) Date of Patent: Jun. 30, 2015

(54) INTEGRATED ADSORBER HEAD AND VALVE DESIGN AND SWING ADSORPTION METHODS RELATED THERETO

(75) Inventors: Jeffrey W. Frederick, Centreville, VA (US); John W. Fulton, Jr., Annandale, VA (US); Robert F. Tammera, Warrenton, VA (US); Richard A. Huntington, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 38 days.

(21) Appl. No.: 13/642,666

(22) PCT Filed: May 6, 2011

(86) PCT No.: PCT/US2011/035610
§ 371 (c)(1),
(2), (4) Date: Oct. 22, 2012

(87) PCT Pub. No.: WO2011/149640
PCT Pub. Date: Dec. 1, 2011

(65) Prior Publication Data
US 2013/0061755 A1    Mar. 14, 2013

Related U.S. Application Data

(63) Continuation-in-part of application No. PCT/US2011/035553, filed on May 6, 2011.

(60) Provisional application No. 61/349,464, filed on May 28, 2010, provisional application No. 61/448,160, filed on Mar. 1, 2011.

(51) Int. Cl.
*B01D 53/04* (2006.01)
*B01D 53/047* (2006.01)

(52) U.S. Cl.
CPC .......... *B01D 53/047* (2013.01); *B01D 53/0446* (2013.01); *B01D 2259/40003* (2013.01)

(58) Field of Classification Search
CPC .. B01D 53/04; B01D 53/047; B01D 53/0446; B01D 2259/40003
USPC ............................ 96/108, 121, 131; 422/177
See application file for complete search history.

(56) References Cited

U.S. PATENT DOCUMENTS

| 1,868,138 A | 7/1932 | Fisk | |
| 2,600,435 A * | 6/1952 | Shapiro | 210/95 |

(Continued)

FOREIGN PATENT DOCUMENTS

| CA | 2297590 | 9/2000 |
| CA | 2297591 | 9/2000 |

(Continued)

OTHER PUBLICATIONS (2008), "Rapid Cycle Pressure Swing Adsorption (RCPSA)," QuestAir, 4 pgs.

(Continued)

*Primary Examiner* — Frank Lawrence
(74) *Attorney, Agent, or Firm* — ExxonMobil Upstream Research Company Law Department

(57) ABSTRACT

An adsorber with minimal dead volume especially suited to reverse-flow applications comprises: a) an adsorber body; b) a first head engaged with said adsorber body; c) a first conduit extending from outside said head to at least partially through said head; and d) a first valve in flow communication with said first conduit controlling fluid flow along a flow path extending from the first valve and through the adsorber body. The adsorber is especially suited for use in a process for swing adsorption separation processes.

16 Claims, 9 Drawing Sheets

(56) References Cited

U.S. PATENT DOCUMENTS

| | | | |
|---|---|---|---|
| 3,124,152 A | 3/1964 | Payne | |
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,207,084 A * | 6/1980 | Gardner | 96/113 |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,374,655 A * | 2/1983 | Grodzka et al. | 96/112 |
| 4,711,968 A | 12/1987 | Oswald et al. | |
| 4,770,676 A | 9/1988 | Sircar et al. | 55/26 |
| 4,784,672 A | 11/1988 | Sircar | |
| 4,790,272 A | 12/1988 | Woolenweber | |
| 4,816,039 A | 3/1989 | Krishnamurthy et al. | |
| 4,846,211 A * | 7/1989 | Scheffler et al. | 137/119.01 |
| 4,877,429 A | 10/1989 | Hunter | |
| 4,977,745 A | 12/1990 | Heichberger | 62/10 |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,286,282 A * | 2/1994 | Goodell et al. | 96/113 |
| 5,292,990 A | 3/1994 | Kantner et al. | |
| 5,306,331 A | 4/1994 | Auvil et al. | |
| 5,370,728 A | 12/1994 | LaSala et al. | |
| 5,565,018 A | 10/1996 | Baksh et al. | |
| 5,662,727 A * | 9/1997 | Castle et al. | 96/115 |
| 5,700,310 A | 12/1997 | Bowman et al. | |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,833,938 A | 11/1998 | Blazejewski | |
| 5,837,205 A | 11/1998 | Bayer et al. | |
| 5,871,349 A | 2/1999 | Johnson et al. | |
| 5,906,673 A | 5/1999 | Reinhold, III et al. | |
| 5,924,307 A | 7/1999 | Nenov | |
| 5,935,444 A | 8/1999 | Johnson et al. | 210/691 |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,039,927 A | 3/2000 | Greco | |
| 6,053,966 A | 4/2000 | Moreau et al. | |
| 6,063,161 A | 5/2000 | Keefer et al. | |
| 6,086,828 A | 7/2000 | Thompson | |
| 6,099,621 A | 8/2000 | Ho | |
| 6,129,139 A | 10/2000 | De Clerc | |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,213,758 B1 | 4/2001 | Tesar et al. | |
| 6,231,302 B1 | 5/2001 | Bonardi | |
| 6,245,127 B1 | 6/2001 | Kane et al. | |
| 6,261,092 B1 | 7/2001 | Cash | |
| 6,284,021 B1 | 9/2001 | Lu et al. | |
| 6,311,719 B1 | 11/2001 | Hill et al. | |
| 6,321,462 B1 | 11/2001 | Seidl et al. | |
| 6,336,278 B1 | 1/2002 | Crawford et al. | 34/80 |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer et al. | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,576,198 B2 | 6/2003 | Cash | |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,651,645 B1 | 11/2003 | Nunez-Suarez | |
| 6,660,065 B2 | 12/2003 | Byrd et al. | |
| 6,669,472 B1 | 12/2003 | Cash et al. | |
| 6,712,087 B2 | 3/2004 | Hill et al. | |
| 6,746,515 B2 | 6/2004 | Wegeng et al. | |
| 6,749,815 B2 | 6/2004 | Cash | |
| 6,752,852 B1 | 6/2004 | Jacksier et al. | |
| 6,783,111 B2 | 8/2004 | Cash et al. | |
| 6,802,889 B2 | 10/2004 | Graham et al. | |
| 6,835,354 B2 | 12/2004 | Woods et al. | |
| 6,889,710 B2 | 5/2005 | Wagner | 137/625.46 |
| 6,892,750 B2 | 5/2005 | Cash | |
| 6,899,121 B2 | 5/2005 | Cash | |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 6,978,977 B2 | 12/2005 | Cash et al. | |
| 7,025,801 B2 | 4/2006 | Monereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,150,446 B1 | 12/2006 | Cash et al. | |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,297,279 B2 | 11/2007 | Johnson et al. | 210/669 |
| 7,311,763 B2 | 12/2007 | Neary | |
| RE40,006 E | 1/2008 | Keefer et al. | |
| 7,314,503 B2 | 1/2008 | Landrum et al. | |
| 7,325,562 B2 | 2/2008 | Cash | |
| 7,390,350 B2 | 6/2008 | Weist, Jr. et al. | |
| 7,399,346 B2 * | 7/2008 | van der Maas | 96/117.5 |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,608,136 B2 * | 10/2009 | van der Maas | 96/117.5 |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |

(56) References Cited

U.S. PATENT DOCUMENTS

| | | |
|---|---|---|
| 7,766,025 B2 | 8/2010 | Greco |
| 7,814,934 B2 * | 10/2010 | Thelen .......................... 137/597 |
| 7,819,948 B2 | 10/2010 | Wagner |
| 7,846,401 B2 | 12/2010 | Hershkowitz et al. |
| 7,858,169 B2 | 12/2010 | Yamashita |
| 7,938,886 B2 | 5/2011 | Hershkowitz et al. |
| 7,947,120 B2 | 5/2011 | Deckman et al. |
| 7,959,720 B2 | 6/2011 | Deckman et al. |
| 8,034,164 B2 | 10/2011 | Lomax, Jr. et al. |
| 8,071,063 B2 | 12/2011 | Reyes et al. |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,216,343 B2 * | 7/2012 | Ackley et al. ...................... 95/96 |
| 8,262,783 B2 | 9/2012 | Stoner et al. |
| 8,268,043 B2 | 9/2012 | Celik et al. |
| 8,272,401 B2 | 9/2012 | McLean |
| 8,319,090 B2 | 11/2012 | Kitamura ...................... 136/244 |
| 8,361,200 B2 | 1/2013 | Sayari et al. |
| 8,444,750 B2 | 5/2013 | Deckman et al. |
| 8,512,569 B2 | 8/2013 | Eaton et al. .................. 210/650 |
| 8,524,159 B2 * | 9/2013 | Hershkowitz et al. ........ 422/129 |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,545,602 B2 | 10/2013 | Chance et al. |
| 8,591,627 B2 | 11/2013 | Jain |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0131728 A1 | 7/2003 | Kanazirev et al. ................ 95/96 |
| 2003/0170527 A1 | 9/2003 | Finn et al. |
| 2003/0205130 A1 | 11/2003 | Neu et al. |
| 2003/0221725 A1 | 12/2003 | Greco |
| 2003/0223856 A1 | 12/2003 | Yuri et al. |
| 2004/0099142 A1 | 5/2004 | Arquin et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0112038 A1 | 5/2005 | Stoll, III et al. ............... 422/175 |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282888 A1 | 11/2008 | Deckman et al. |
| 2008/0289497 A1 | 11/2008 | Barclay et al. |
| 2008/0307966 A1 | 12/2008 | Stinson .......................... 95/187 |
| 2008/0314244 A1 | 12/2008 | Kelley et al. |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0241771 A1 | 10/2009 | Manning et al. |
| 2009/0308248 A1 | 12/2009 | Siskin et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. ............... 210/688 |
| 2008/0314245 A1 | 2/2011 | Nakashima |
| 2011/0031103 A1 | 2/2011 | Deckman et al. |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0308524 A1 | 12/2011 | Brey et al. ................. 128/205.12 |
| 2012/0024152 A1 | 2/2012 | Yamawaki et al. |
| 2012/0026797 A1 | 2/2012 | Kim |
| 2012/0026799 A1 | 2/2012 | Lee |
| 2012/0026801 A1 | 2/2012 | Lee |
| 2012/0026802 A1 | 2/2012 | Confalonieri |
| 2012/0026803 A1 | 2/2012 | Lee |
| 2012/0026804 A1 | 2/2012 | Nagashima et al. |
| 2012/0031144 A1 | 2/2012 | Northrop et al. |
| 2012/0067216 A1 | 3/2012 | Corma Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2013/0340619 A1 * | 12/2013 | Tammera ........................ 96/121 |

FOREIGN PATENT DOCUMENTS

| | | | |
|---|---|---|---|
| CA | 2224471 | 10/2000 | |
| CA | 2234924 | 12/2001 | |
| CA | 2237103 | 12/2001 | |
| CA | 2228206 | 1/2002 | |
| CA | 2357356 | 11/2005 | |
| CA | 2423178 | 4/2013 | ............... C02F 1/28 |
| EP | 0257493 | 2/1988 | |
| EP | 0426937 | 5/1991 | |
| EP | 1004341 | 5/2000 | |
| EP | 1018359 | 7/2000 | |
| EP | 1413348 | 8/2002 | |
| EP | 1577561 | 9/2005 | |
| EP | 1203610 | 12/2005 | |
| EP | 1798197 | 6/2007 | |
| EP | 1045728 | 11/2009 | |
| JP | 58-114715 | 7/1983 | ............. B01D 53/50 |
| JP | 59-232174 | 12/1984 | |
| JP | 60-189318 | 12/1985 | ............... H03K 6/00 |
| JP | 02-253818 | 10/1990 | ............ B01D 53/04 |
| JP | 11280921 | 10/1999 | |
| JP | 2000024445 | 8/2001 | |
| JP | 2002348651 | 12/2002 | |
| JP | 2006016470 | 1/2006 | |
| JP | 2006036849 | 2/2006 | |
| JP | 2008-272534 | 11/2008 | ............ B01D 53/04 |
| WO | WO99/43418 | 9/1999 | |
| WO | WO00/35560 | 6/2000 | |
| WO | WO03-031328 | 4/2003 | ............. C01B 13/02 |
| WO | WO2005/032694 | 4/2005 | |
| WO | WO2005/070518 | 8/2005 | |
| WO | WO2006/017940 | 2/2006 | |
| WO | WO2006/074343 | 7/2006 | |
| WO | WO2007/111738 | 10/2007 | |
| WO | WO 2008/143820 | 11/2008 | |
| WO | WO 2008/143821 | 11/2008 | |
| WO | WO 2008/143823 | 11/2008 | |
| WO | WO 2008/143825 | 11/2008 | |

(56) References Cited

FOREIGN PATENT DOCUMENTS

| WO | WO 2008/143826 | 11/2008 | | |
|---|---|---|---|---|
| WO | WO 2008/143964 | 11/2008 | | |
| WO | WO 2009/064569 | 5/2009 | | |
| WO | WO 2009/134543 | 11/2009 | | |
| WO | WO2010/130787 | 11/2010 | | |
| WO | WO2011/139894 | 11/2011 | | |
| WO | WO2010-081809 | 12/2011 | ............. | B01D 53/04 |
| WO | WO 2012/067719 | 5/2012 | | |
| WO | WO 2012/118737 | 9/2012 | | |
| WO | WO 2012/118755 | 9/2012 | | |
| WO | WO2012/118755 | 9/2012 | | |
| WO | WO2012/118757 | 9/2012 | | |
| WO | WO 2012/118757 | 9/2012 | | |
| WO | WO2012/118758 | 9/2012 | | |
| WO | WO 2012/118758 | 9/2012 | | |
| WO | WO2012/118759 | 9/2012 | | |
| WO | WO2012/118760 | 9/2012 | | |
| WO | WO 2012/118760 | 9/2012 | | |
| WO | WO2012/161826 | 11/2012 | | |
| WO | WO2012/161828 | 11/2012 | | |
| WO | WO2013/022529 | 2/2013 | | |

OTHER PUBLICATIONS (2008), "Rapid Cycle Pressure Swing Adsorption," ExxonMobil Research and Engineering, 2 pgs.
U.S. Appl. No. 13/602,750, filed Sep. 4, 2012, Sundaram, N. et al.
Conviser, S. A. (1964) "Removal of $CO_2$ from Natural Gas With Molecular Sieves," *Publication*, pp. 1F-12F.
GE Oil & Gas (2007) "Dry Gas Seal Retrofit," Florene, Italy, www.ge.com/oilandgas.
Farooq, S. et al. (1990) "Continuous Contercurrent Flow Model for a Bulk PSA Separation Process," *AIChE J.*, v36 (2) p. 310-314.
FlowServe "Exceeding Expectations, US Navy Cuts Maintenance Costs With Flowserve GX-200 Non-Contacting Seal Retrofits," *Face-to-Face*, v17.1.
Herrmann, F. J. et al. (2008) "Curvelet-Based Seismic Data Processing: A Multiscale and Nonlinear Approach," *Geophysics*, v73.1, pp. A1-A5.
Hopper, B. et al. (2008) "World's First 10,000 psi Sour Gas Injection Compressor," *Proceedings of the $37^{th}$ Turbomachinery Symosium*, pp. 73-95.
Reyes, S. C. et al. (1997) "Frequency Modulation Methods for Diffusion and Adsorption Measurements in Porous Solids," *J. Phys. Chem. B.* v101, pp. 614-622.
Sahni, I et al. (2005) "Multiresolution Wavelet Analysis for Improved Reservoir Description," SPE-87820, *Soc. of Petroleum Eng.—Reservoir Evaluation & Engineering*, pp. 53-69 (XP-002550569).
Stahley, J. S. (2003) "Design, Operation, and Maintenance Considerations for Improved Dry Gas Seal Reliability in Centrifugal Compressors," pp. 1-15.
Suzuki, M. (1985) "Continuous-Countercurrent-Flow Approximation for Dynamic Steady State Profile of Pressure Swing Adsorption" *AIChE Symp. Ser.* v81 (242) pp. 67-73.
U.S. Appl. No. 61/578,041, filed Dec. 20, 2011, Oelfke et al.
*International Search Report and Written Opinion,* dated Jul. 25, 2011, PCT/US2011/35610.
Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

\* cited by examiner

US 9,067,168 B2

INTEGRATED ADSORBER HEAD AND VALVE DESIGN AND SWING ADSORPTION METHODS RELATED THERETO

CROSS-REFERENCE TO RELATED APPLICATIONS

This application is the National Stage entry under 35 U.S.C. 371 of PCT/US2011/035610 that published as WO 2011/149640 and was filed on 6 May 2011, which claims the benefit of U.S. Provisional Application Nos. 61/349,464, filed 28 May 2010, and 61/448,160, filed 1 Mar. 2011, and PCT/US2011/035553, filed 6May 2011, each of which is incorporated herein by reference, in its entirety, for all purposes.

FIELD

The present invention relates to an adsorber whose configuration includes a valve associated with the adsorber head which minimizes dead volume between the valve and adsorber bed and provides for a durable valve arrangement. The present invention also relates broadly to a process for using such an adsorber.

BACKGROUND

Reverse-flow reactors (RFRs) and adsorption units are known in the art. Typical RFRs include, for example, Wulff pyrolysis and regenerative reactor and other regenerative reactors, including regenerative thermal oxidizers (RTO). These reactors are typically used to execute cyclic, batch-generation, high temperature chemistry. Regenerative reactor cycles are either symmetric (same chemistry or reaction in both directions) or asymmetric (chemistry or reaction changes with step in cycle). Symmetric cycles are typically used for relatively mild exothermic chemistry, examples being regenerative thermal oxidation (RTO) and autothermal reforming (ATR). Asymmetric cycles are typically used to execute endothermic chemistry, and the desired endothermic chemistry is paired with a different chemistry that is exothermic (typically combustion) to provide heat of reaction for the endothermic reaction. Examples of asymmetric cycles are Wulff pyrolysis processes and pressure swing reforming processes (PSR). instance, one feature of RFRs is a gas hourly space velocity, which is the space velocity of a gas over a given reactor volume. Typically, a high gas hourly space velocity (and hence reactor productivity) has a small reactor cycle time, while low has hourly space velocity has a longer reactor cycle time. For pyrolysis processes using a RFR, high velocities are needed to achieve short residence times that facilitate conversion to preferred products. A second feature is that the volume of gas remaining in the RFR at the end of one cycle (void volume) should be managed, e.g., swept out, before the beginning of the next cycle, which gas-volume management may result in inefficiency and additional costs. A third feature is that bed structures (packing) needed to provide rapid heat transfer (for sharp thermal gradients and resulting high efficiency) also results in high pressure drop. Thus, the RFR design should consider space velocity, void volume, and packing properties to properly manage the system. Accordingly, certain drawbacks in conventional RFRs, such as properties of conventional packing and long cycle times, have prevented these reactors from being broadly used in the energy and petrochemical fields.

RFRs have historically utilized different packing material in the bed structures. Typically, these reverse-flow reactors utilize checker brick, pebble beds or other available packing. This type of bed structure typically has low geometric surface area ($a_v$), which minimizes pressure drop per unit of reactor length, but also reduces volumetric heat transfer rate. One basic principle of an asymmetric reverse flow reactor is that heat is stored in one step and is used to accomplish a desired endothermic chemistry in a second step. Thus, the amount of desired chemistry that can be achieved, per volume of reactor, is directly related to the volumetric heat transfer rate. Lower heat transfer rates thereby require larger reactor volumes to achieve the same amount of desired chemical production. Lower heat transfer rates may inadequately capture heat from RFR streams, leading to greater sensible heat loss and consequently lower efficiency. Lower heat transfer rates may also lead to longer cycle times, as the stored heat is used more slowly, and therefore lasts longer for a given bed temperature specification. Historic RFR's, with low-$a_v$ checker-brick or pebble bed, packing are larger (e.g., longer and more capital intensive) and have cycle times of two minutes or greater. As such, these reactors limit reactor efficiency and practical reactor size.

As an enhancement, some RFRs may utilize engineered packing within the bed structure. The engineering packing may include a material provided in a specific configuration, such as a honeycomb, ceramic foams or the like. These engineered packings have a higher geometric surface area ($a_v$), as compared to other bed structures. The use of this type of packing allows for higher gas hourly space velocity, higher volumetric reactor productivity, higher thermal efficiency, and smaller, more economical reactors. However, these more-economical reactors use heat more rapidly and thus may require reduced cycle times. Pressure swing reforming processes (PSR) are an example of such a preferred RFR.

Further, as a result of using this type of packing material, the size of the reactor may be reduced, which provides significant capital cost savings. However, adjusting the packing material of the reactors impacts other operational features. For instance, the increase in volumetric surface area ($a_v$) is typically accomplished using smaller flow channels that result in higher pressure drop per unit of reactor length. To compensate for this, these enhanced RFR's are configured to have short lengths. When applied to large petrochemical applications, diameter is increased to enable high productivity, but length is limited by pressure drop, thus leading to a high ratio for diameter per length (D/L). Conventional reactor designs typically collect fluids emerging from a bed and duct those fluids to some external valve. The volume of such ducting is in some proportion to the reactor diameter, because the ducting needs to collect gas from the entire diameter. Thus, for a conventional reactor having a high D/L ratio, the volume of ducting can be very large compared to the volume inside the bed. Use of a conventional reactor design for an enhanced RFR thus results in large void volumes (primarily in the ducting), which creates problems for gas volume management.

Unfortunately, conventional reactor valve systems have certain limitations that do not operate properly for enhanced, high-productivity reactors (e.g., compact reactors employing short cycle times). For instance, conventional reactor valve systems typically fail to meet the durability requirements of RFRs and may not handle the short cycle times. Petrochemical valves can have maximum cycle lifetimes on the order of 500,000 cycles, which correspond to less than one year of operation—inadequate for petrochemical use involving rapid cycle times. In addition, conventional valves are placed outside the reactor and use manifolding to carry gases between the bed and the valve, while providing uniform flow distribution across the bed. Given the wide and short beds of RFRs, this manifolding holds a large gas volume that has to be managed on every cycle change.

Although there are some similarities between the reactors described above and conventional adsorption units, adsorption unit design criteria is often different from reactor design criteria. In adsorption units, there may or may not be a chemical reaction. Many adsorptive processes rely on physical processes that do not involve a chemical reaction. Moreover, adsorption kinetics are often not comparable to reaction kinetics.

Accordingly, it is desirable to provide an adsorber that minimizes dead volumes between its valves and adsorber beds, while providing extended valve lifetimes to millions of cycles, in rugged, high-temperature conditions at the adsorber inlet and outlet. Further, there is a need for an enhanced method and apparatus to implement an industrial-scale, adsorber, which has valves that enhance the cycle time and manage the purging of fluid between cycles. The present techniques provide a method and apparatus that overcome one or more of the deficiencies discussed above.

SUMMARY

Provided is an adsorber comprising: a) an adsorber body; b) a first head engaged with said adsorber body; c) a first conduit extending from outside said head to at least partially through said head; and d) a first valve in flow communication with said first conduit controlling fluid flow along a flow path extending from the first valve and through the adsorber body. For present purposes, "flow path" may be characterized as the total volume through which fluid passes, including an open flow path. For present purposes, a "head" may be a dished head, meaning it is of substantially concave shape internally, e.g., it can be substantially round, substantially elliptical, substantially torispherical, or substantially hemispherical.

Also provided is an adsorber comprising: a) an adsorber body partially enclosing an adsorption region comprising two substantially opposing open ends; b) a first head capping one end of the adsorber body; c) a second head capping the opposing end of the adsorber body; d) a fixed bed comprising a region proximal to the first head, a region proximal to the second head and a central region disposed therebetween, which fixed bed is disposed within the adsorber body and comprises solid material capable of promoting adsorption of a gas stream; e) at least one gas stream inlet associated with the first head opening a pathway through the first head and into the adsorber body and at least one gas stream outlet associated with the second head opening a pathway from the adsorber body and through the second head; f) at least one inlet poppet valve controlling the gas stream inlet and integrated with the head associated with the inlet, the inlet poppet valve comprising a linearly actuatable valve stem; g) at least one outlet poppet valve controlling the gas stream outlet and integrated with the head associated with the outlet, the outlet poppet valve comprising a linearly actuatable valve stem; and h) at least one actuator engageable with the linearly actuatable valve stem of f) and/or g) providing valve opening and closing by imparting linear motion to the poppet valve to allow gases to pass from outside the adsorber to inside the adsorber body, and from inside the adsorber body to outside the adsorber so as to provide changeable flow operation.

Further provided is a process for rapid stream-switching of at least two streams in a reverse-flow adsorber comprising an adsorber body partially enclosing an adsorption region comprising two substantially opposing open ends with a first head capping one end of the adsorber body, a second head capping the opposing end of the adsorber body, a fixed bed disposed within the adsorber body comprising solid material capable of promoting adsorption of a gas stream. The process comprises: i) introducing from one or more inlet gas sources at least one first gas stream to at least one gas stream inlet associated with the first head through the first head and into the adsorber body and withdrawing a treated first gas stream from the adsorber body and through the second head to at least one gas stream outlet associated with the second head; wherein said introducing and withdrawing are controlled respectively by at least one intake poppet valve located in the first head and at least one exhaust poppet valve located in the second head; and ii) introducing from one or more inlet gas sources at least one second gas stream to at least one gas stream inlet associated with the second head through the second head and into the adsorber body and withdrawing a treated second gas stream from the adsorber body and through the first head to at least one gas stream outlet associated with the first head, wherein said introducing and withdrawing are controlled respectively by at least one intake poppet valve or other intake flow control means located in the second head and at least one exhaust poppet valve located in the first head.

In one or more embodiments, the space at the top of the adsorber bed that allow for the opening of the valves and the redistribution of the flow is dead volume. The dead volume is preferably swept in swing adsorption methods to obtain higher product recovery. For example, a beneficial dead volume is about 0.5-2.0% of the straight side of the vessel at each end. An even flow distribution within the bed is preferred to provide sufficient capacity to make the adsorber economical. Preferably, a coefficient of variance of 0.5-2.0% is provided for the flow rate of the channels.

DETAILED DESCRIPTION

Figure 1:
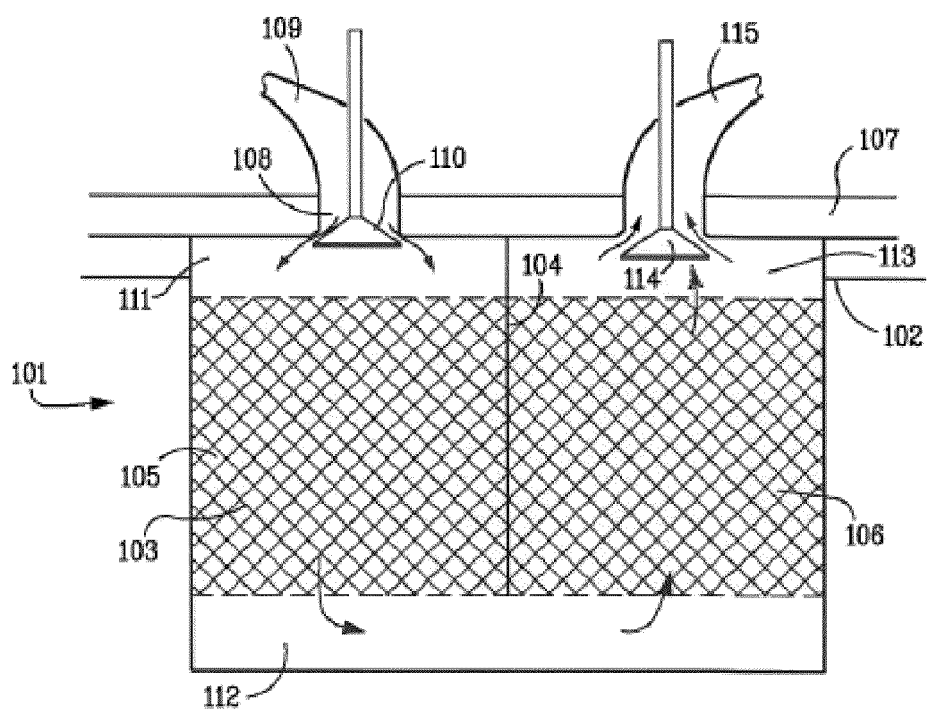
FIG. 1 is an illustration of an asymmetric adsorber with a single head and associated valve assembly according to an embodiment of the present invention.

Provided is an adsorber system having reduced open flow path volume between the valves and adsorber beds with extended valve life even under high-temperature conditions may be achieved by an adsorber configuration or design that substantially integrates valves into an adsorber head. Such a design can enable the introduction and removal of overall large flow volumes with minimum pressure drop and low dead volume, and with substantially uniform flow distribution. For present purposes, open flow path volume corresponds to the volume outside of the adsorber beds that affect the gas treating along the flow path between the valves and the adsorption bed. This open flow path volume contributes little to the treatment of gases in the adsorber, but may hold large volumes of gases that should be managed with every reversal of flow direction in the operating cycle of the adsorber, either by accommodating gases of one step in the product stream of the opposing step, or by providing a means and/or fluids to sweep this gas out of the adsorber in between steps of opposing flow direction. The design of the present adsorber uses one or more valves, e.g., poppet valves—typically comprising a disk element that modifies the opening controlled by the valve, and a stem element on which an actuating means may operate—for each process stream. As may be appreciated, the poppet valve may include other elements that perform essentially similar function to the disk element, such as other geometric shapes (e.g., elliptical or a hemispherical shapes) or different profiles depending on a specific configuration. Each of the valves may be located substantially within the adsorber head. Multiple valves can be used for large diameter heads with manifolding outside the valves to carry feeds and products to and from the valves.

Reverse-flow adsorbers, and even regenerative heat exchangers, typically perform some treatment to the gases that pass through. When flow is reversed, regions near an inlet become regions near an outlet, and gas compositions or conditions that are typical of inlet conditions for one step are suddenly proximate to, and even flow into, the outlet of the subsequent step. For asymmetric reverse-flow adsorbers, gasses in alternate steps may be very different. Impurities in one step may be inappropriate for the next. For example, in steam reforming a regeneration stream may be composed mostly of nitrogen, while reforming streams may be composed mostly of hydrogen, and residual oxygen from regeneration may be problematic as a contaminant in the reforming product hydrogen. The extent of this contamination problem is minimized in the present techniques by providing an adsorber that minimizes the volume of gasses that remain in the adsorber at the end of a step. Additional steps may be taken to mitigate the extent or impact of gas carryover. The adsorber may be purged at the end of one step to eliminate problematic components. In the above-mentioned steam reforming example, inert gas may be introduced into the adsorber to sweep residual oxygen out before beginning hydrogen manufacture. Purging gases may be introduced using additional sets of the poppet valves described in this application, or may be introduced via more conventional means, such as conduits passing through the heads with more conventional process valves and manifolds located outside the head. Achieving high uniformity of bed velocity, as described herein, may be less important for purging streams than for adsorptive streams because there is reduced expectation of treating these purging streams. Alternatively, accommodation may be made in post-adsorber processing for contaminants that arise due to cycling. For example, hydrocarbon that remains in the adsorber after a steam reforming step may be managed as a combustion product contaminant by means of a catalytic converter in the flue gas to burn out remaining fuel. The magnitude of post adsorber treatments, and/or the magnitude of purging requirements is minimized by use of an adsorber, as disclosed herein, that minimizes unnecessary gas volumes residing within the adsorber.

In one or more embodiments an adsorber includes: a) an adsorber body; b) a first head engaged with said adsorber body; c) a first conduit extending from outside said head to at least partially through said head; and d) a first valve in flow communication with said first conduit controlling fluid flow along a flow path extending from the first valve and through the adsorber body. In certain embodiments, the term "conduit" describes those portions of the adsorber which can provide a path for fluid flow from a location outside the adsorber body and through at least a portion of the head or a valve seat associated with the head, toward the adsorber body. In some embodiments, a conduit extends completely through the head and into the adsorber body. In certain embodiments, a conduit can include manifolds or other portions of the adsorber that guide fluid flow from outside the adsorber body towards the adsorber body. For present purposes, "flow path" can be characterized as the space within the adsorber through which feed gases and/or products flow. The volume of the flow path typically consists of i) a packed flow path volume (further characterized below) within a solids-fluids contact portion of the adsorber bed and ii) an open flow path volume (further characterized below) between the valve(s) and the adsorber bed, as well as any open flow portion within the adsorber bed. Typically, a products fluid flows into the adsorber through a controlling inlet valve and out of the adsorber through a controlling outlet valve. As the fluid traverses between inlet and outlet valves, it travels through regions where there is substantial contact with adsorber contents (called packed flow path volume) and regions where there is little contact with adsorber bed contents (called open flow path volumes). The sum of pathways within the adsorber volume that are accessible to the flowing fluid as it passes from inlet valve to outlet valve are considered herein to be the fluid "flow path", and it comprises both packed and open adsorber volumes. Typically, these two volumes sum to the total adsorber volume available for flow that is in between the valves that are on opposing ends of the flow path and are controlling fluid flow along the flow path. Conveniently, such volumes are measured and calculated with valves in closed positions. Volumes of insulating materials at the perimeter of the adsorber vessel are typically not considered to be part of either flow path volume because it is not expected that any substantial flow travel through the insulation. Volumes are computed on a bulk basis, to include solids and void spaces within adsorber components, as long as solids are reasonably proximate to fluid flow paths, preferably at a distance less than 2 centimeter (cm) from a fluid flow path.

In some embodiments, the adsorber further comprises at least one of: e) a second head engaged with said adsorber body; f) a second conduit extending from outside the first head or the second head to at least partially through said respective head; and g) a second valve in flow communication with said second conduit controlling fluid flow along the flow path including a portion extended from the adsorber body to the second valve.

In some embodiments, the first valve has a substantially open position when fluid flow in the flow path is in a first flow direction and a substantially closed position when fluid flow in the flow path is in a second, opposite flow direction. The adsorber can have a first valve pair on opposite sides of at least a portion of the flow path, wherein said first valve and second valve are each in a substantially open position when fluid flow in the flow path is in a first flow direction and a substantially closed position when fluid flow in the flow path is in a second, opposite flow direction.

In some embodiments, the adsorber further comprises: h) a third conduit extending from outside the first head or the second head to at least partially through said respective head; i) a third valve in flow communication with said third conduit controlling fluid flow along the flow path including a portion extended from the adsorber body to the third valve; j) a fourth conduit extending from outside the first head or the second head to at least partially through said respective head; and k) a fourth valve in flow communication with said second conduit controlling fluid flow along the flow path including a portion extended from the adsorber body to the fourth valve. The adsorber can have a second valve pair comprising said third valve and said fourth valve on opposite sides of at least a portion of the flow path, controlling flow in the second, opposite flow direction wherein the third valve and the fourth valve are each in a substantially closed position when the fluid flow in the flow path is in the first flow direction and in a substantially open position when fluid flow in the flow path is in the second, opposite flow direction.

In certain embodiments, the adsorber is a regenerative adsorber capable of operating with regenerative adsorber cycles which are symmetric, i.e., with the same adsorption kinetics in both directions.

In other embodiments, the adsorber is a regenerative adsorber capable of operating with regenerative cycles which are asymmetric, i.e., an asymmetric reverse flow adsorber, in which the adsorption kinetics change according to each step in the cycle, or directional flow. In any event, asymmetric reverse flow adsorber requires that the combined forward flow and combined reverse flow differ in composition.

In other embodiments, the adsorber comprises one or more additional valves, each in flow communication with one of said first, second, third, or fourth conduits via an additional conduit extending at least partially through said additional conduit's respective head, operating in phase with any other valves in fluid communication with said additional conduit and controlling fluid flow along the flow path including a portion extended from the adsorber body to the respective valve. In these embodiments, the term "in flow communication with" or "in fluid communication with" means in direct flow communication, i.e., without intervening valves or other closure means for obstructing flow, and also means flow communication within the head or attached manifolds, i.e., not in fluid communication by means of the adsorber flow path. Such embodiments include those where an additional conduit carrying fluid to its associated valves is located entirely within its head. For example, a conduit comes into a head from outside the head (as a primary conduit) and branches into one or more "additional conduits" (or secondary conduits) extending to different valves which control flow from the conduits through the valves to a flow path directed through the adsorber body. The same flow path can be used by flows in both the forward and reverse directions, the direction depending on which valves in the adsorber are open and which valves are closed. For present purposes, an "additional conduit" can be a primary conduit or a secondary conduit, depending on the particular adsorber design. Thus, in some embodiments two neighboring valves (typically within the same head) carry the same gas stream and operate in phase.

The term "operate in phase" as used here and elsewhere throughout the present specification relates to two or more inlet valves or two or more outlet valves opening and closing substantially together, say, with at least 80% overlap, say at least 90% overlap (with 100% overlap being identical or completely in phase). For example, considering the time interval during which a valve is in a certain state, i.e. open or closed, at least 80%, say at least 90% of that time interval is common to all valves that are "in phase." In other embodiments, tolerances on valve phasing are tighter to enable the allowance of less time in between valve changes. In such embodiments, considering the time interval during which a valve is changing state, i.e., opening or closing, at least 80%, preferably at least 90% of that time interval is common to all valves that are "in phase." In certain embodiments of the present techniques, valves that are in phase may have a range of time to begin the travel from open to close. As an example, the first valve may begin opening at time 0 and the final valve in the same phase may begin opening at some time in the future $t_0$ (typically a small fraction of the valve open time or in some embodiments of the valve opening time) and still has the same fluid flow composition and direction. Valves that are in phase may or may not open to the same lift height. For valves that are in phase, the height from the valve with the highest lift height to the valve with the lowest lift height, the lowest lift height may be down to 20% or even 50% of lift height of the valve with the highest lift height.

The first conduit may pierce the upper external surface of the head, while the "additional conduit" can be contained entirely within the head, although the actuation mechanism of the additional conduit's associated valve can, in some embodiments, pierce the head in which it resides. Alternately, this associated valve can be actuated by the same mechanism that activates the primary conduit's associated valve. During operation, these embodiments of the adsorber typically comprise four basic primary conduits for: forward flow inlet (or intake), forward flow outlet (or exhaust), reverse flow inlet (or intake), and reverse flow outlet (or exhaust), with at least one valve being associated with each. In some embodiments, more than one valve can be associated with at least one of the basic conduits. An additional valve increases the capacity of the conduit with which it is associated. Typically, valves associated with a particular primary conduit or its associated secondary conduit are operated together substantially in phase to provide a flow in one direction along a specific flow path. Certain embodiments of the adsorber utilize only primary conduits, extending outside the head, with no secondary conduits present. This improves ease of servicing the associated valves which are accessible from outside the adsorber.

In certain embodiments of the adsorber, the adsorber body comprises an adsorber bed, and the volume of the flow path consists of i) a packed flow path volume within a solids-fluids contact portion of the adsorber bed and ii) an open flow path volume between the valve(s) and the adsorber bed, as well as any open flow portion within the adsorber bed. Typically, the packed flow path volume comprises the volume in the adsorber bed that is at a distance less than 2 cm from a solids-fluid contact surface, preferably less than 1 cm from a solids-fluid contact surface. Defined as such, the packed flow path volume includes both solid and fluid volume along the flow path. Typically, it represents the bulk volume of the region of an adsorber bed containing bed packing and through which the fluids are flowing. The solids-fluids contact portion of the adsorber bed typically has a wetted area greater than 0.5 $cm^2/cm^3$ in all regions of said portion of the adsorber bed. The term "wetted area" as used herein represents the area of fluid/solid boundaries within a unit volume, divided by that unit volume. As used in the present disclosure, "wetted" simply means an interface between fluid and solid and is not meant to imply contact with a specific fluid such as water. The wetted area is also known in the art as packing surface area, and sometimes as geometric surface area, and is understood in the art to include fluid/solid boundaries in channels that are relevant to bulk flow through the bed. As such, wetted area typically does not include area within any micro pores that might be within packing or channel walls. In some embodiments, the ratio of the open flow path volume to packed flow path volume is less than 1, preferably, less than 0.5. Packed flow path volume is typically measured by calculating that volume in the flow path wherein solids-fluids contact occurs as a fluid passes through the adsorber body. Open flow path volume constitutes the remainder of volume in the flow path of the adsorber body and can include not only those spaces in the adsorber body above and below an adsorber bed, but also regions within the adsorber bed wherein solids-fluids contact does not occur, e.g., mixing zones or any other zones within the adsorber bed which lack surfaces providing intimate solids contact with the flowing fluids along the flow path. As a matter of convenience, open flow path volume is typically computed with all valves in their closed positions.

In some embodiments, the adsorber bed comprises a fixed bed core comprising solid material capable of heat exchange. Such solid materials are selected to be durable against the physical and chemical conditions within the adsorber and can include metallic, ceramic, or other, depending on the adsorption process intended. In certain embodiments, at least one of the valves is a poppet valve comprising a disk element connected to a valve stem element. The poppet valve disk element typically has a surface facing the proximal adsorber bed surface, similar to those encountered in internal combustion engines. The surface of the disk element can be substantially round, for seating in a substantially round opening. For present purposes, the term "substantially round" can include ellipsoidal shapes such as those found in certain high performance engines. This surface can also be flat or profiled. In certain embodiments wherein the poppet valve disk element may have a surface that is profiled inward or outwardly relative to the opening on which it operates.

In some embodiments, the surface of the poppet valve is substantially parallel to the proximal adsorber surface. Other suitable valves for the present techniques are known to those of skill in the art and can include rotary valves sleeve valves, slide valves, plunger valves and butterfly valves. The valves are made of a suitable material that can withstand the conditions such as temperature, pressures, adsorber maintenance schedules, etc. encountered for a specific valve location within the adsorber. For extreme high temperature conditions ceramics can be used, while metallic valves are suitable for most applications below this temperature. Depending on the adsorber design, the poppet valve opens toward the adsorber bed or opens away from the adsorber bed. Certain embodiments where the poppet valve opens toward the adsorber bed may be preferred because of ease of managing flow and pressure drop in the piping and/or head design. Certain embodiments where the poppet valve opens away from the adsorber bed may be preferred for two reasons. First, to relieve pressure in an over pressurized adsorber, e.g., where the pressure is sufficient to overcome the force generated by a biasing closure spring. This can obviate the need for separate pressure relief valves and can be useful where an adsorber is susceptible to rapid pressure buildup. Moreover, such embodiments provide less dead space in the adsorber than those where poppet valve opens towards the adsorber bed. A flow distributor is useful in such embodiments to control resulting different flow patterns and fills up additional dead space in the adsorber.

In certain other embodiments, a gas distributor mechanism may be positioned between the valves and bed surface. An example gas distributor mechanism is described in U.S. Patent Application Publication No. 2007/0144940. The gas distributor mechanism may function to direct gas to select channels within the bed. In a preferred embodiment, the spacing between the fully-open valves and the bed surface, such as between 5 to 200% of the disk element diameter, provide sufficient space for such distributors. However, the presence of such mechanisms, as well as other adsorber features, such as bed support structures, may result in a modified spacing and/or result in the selection of bed-valve spacing at the higher end of the preferred range.

Typically, the distance during operation between the poppet valve disk element flat or profiled surface in the fully open position and the adsorber bed surface is between 5% and 200% of the disk element diameter, preferably, between 20% and 80% of the disk element diameter. The poppet valve typically comprises a poppet valve stem element, or rod, extending to a location outside its head. The valve stem can be surrounded by a bushing and/or valve guide which provides support of the valve while allowing movement along a linear path to guide and, in some cases, seals the valve during operation. In some embodiments, a valve stem seal is associated with the valve stem, e.g., rod packing as is typically seen in reciprocating compressors. For present purposes, in some instances a valve stem seal can be the same as a bushing or valve guide, although a separate valve seal is less susceptible to wear in use.

In certain embodiments of the adsorber, each valve is associated with an externally accessible valve seat that fits within its respective inlet to the adsorber body and/or outlet from the adsorber body and is sealed to the head by any suitable sealing means, e.g., a gasket which is held in place by the flange attaching the valve assembly to its respective inlet. Alternatively, the valve assembly can be attached to its respective inlet via a rotatable locking mechanism, e.g. a turn-to-lock or bayonet mechanism. In other embodiments, the valve seat can be installed in the head separate from the valve assembly by use of threaded-in or pressed-in seats, or by the machining of the valve seat into the head itself In some embodiments, the poppet valve comprises a linearly actuatable valve stem engageable with an actuator to open and close the valve by imparting linear motion thereto. The actuator is at least one of pneumatically actuated, hydraulically actuated, and electromagnetically actuated, in at least one direction. In other embodiments the actuator can be actuated by a camshaft, in at least one direction. An alternate return mechanism can be used, e.g., a spring, in certain embodiments, e.g., with a valve closing bias. An alternate actuation approach employs a common actuator on linearly aligned plural valves common to a particular fluid flow stream.

Poppet valves in certain embodiments can comprise a circular disk element connected to a solid cylindrical stem element. Diameter of the poppet ($D_P$) (subscript "P" for poppet valve) can be measured across the disk element. Lift, ($L_P$) can be measured as the distance that the poppet valve is translated to create open area for flow. An assembly of poppet valves can also be characterized in terms of the spacing between the valves. The spacing ($S_P$) describes the center to center spacing. Thus, if two equal diameter ($D_P$) valves have a spacing that is exactly equal to $D_P$ (i.e. 100% of $D_P$), the two poppet disk elements may just touch each other on their circumference. Valve spacing, or spacing between valves, can be characterized as the center-to-center measurement of the valves as a percent of the valve diameter ($D_P$). As the valves get closer together they tend to create a flow restriction on the inside of the adsorber, as well as a constructability issue on the outside. Moreover, large valve spacings create concerns about flow area sufficiency and flow distribution into the bed. Accordingly, suitable valve spacing should balance these opposing factors. Spacing of the valves is typically between 120% and 400% of the valve diameter, preferably, between 140% and 200%. For spacing between valves of different diameter, the average diameter may be used as divisor. This preferred spacing applies to each of the adjacent valves on a given head, regardless of whether those valves carry the same stream. It is not expected that each of the adjacent valves has identical spacing, but it is preferred that each of the adjacent valves have spacing within the ranges provided.

In certain embodiments, the circular poppet valves associated with a particular head are substantially circular, uniform in diameter and spaced center-to-center by 120% to 400% of the average poppet valve disk element diameter, preferably, spaced center-to-center by 140% to 200% of the average poppet valve disk element diameter.

In some embodiments, the adsorber provides at least one of: i) a valve pressure drop as fluid flows through a valve of from 1% to 100% of the adsorber internal pressure drop; ii) a ratio of total stream poppet valve flow area for one of an inlet stream and an outlet stream to adsorber flow area ranging from 1% to 30%; iii) a poppet valve diameter between minimum value $D_{PMIN}$, which is defined in the equation 1 below:

$$(D_{PMIN})[\text{inches}] = 0.1484 + 0.4876 * D_B [\text{feet}], \qquad 1$$

$$(D_{PMIN})[\text{cm}] = 0.3769 + 0.0406 * D_B [\text{cm}] \qquad 1a$$

where $D_B$ is flow area diameter in the units indicated in the square brackets, and a maximum value $D_{PMAX}$, which is defined in the equation 2 below:

$$(D_{PMAX})[\text{inches}] = 1.6113 + 1.8657 * D_B [\text{feet}], \qquad 2$$

$$(D_{PMAX})[\text{cm}] = 4.0927 + 0.1555 * D_B [\text{cm}] \qquad 2a$$

where $D_B$ is flow area diameter in the units indicated in the square brackets; iv) $L_P/D_P$, (the ratio of valve lift to poppet diameter) ranges between 3% and 25%; and v) valve lift times of at least 50 milliseconds. As may be appreciated, the poppet flow area $A_{PFI}$ relates to the diameter, the lift and the number of valves, and is defined by the equation 3 below:

$$A_{PFI} = N_{FI} * \pi * D_{PFI} * L_{PFI} \qquad 3$$

where FI is "forward flow inlet," A is area, N is number of valves, D is diameter, and L is lift.

Typically, the adsorber provides at least one of: i) a valve pressure drop as fluid flows through a valve of from 5% to 20% of the adsorber internal pressure drop; ii) a ratio of total stream poppet valve flow area for one of an inlet stream and an outlet stream to adsorber flow area ranging from 2% to 20%; iii) a poppet valve diameter between minimum value ($D_{PMIN}$) [inches]=0.1484+0.4876*$D_B$[feet], where $D_B$ is flow area diameter in feet, and maximum value ($D_{PMAX}$)[inches]= 1.6113+1.8657*$D_B$[feet], where $D_B$ is flow area diameter in feet; iv) $L_P/D_P$, (the ratio of valve lift to poppet diameter) ranges between 5% and 20%; and v) valve lift times between 100 and 500 milliseconds. Further, the ratio of total stream poppet valve flow area for a particular inlet stream or outlet stream to adsorber flow area is between 1% to 30%, preferably, between 2% and 20%.

Figure 3:
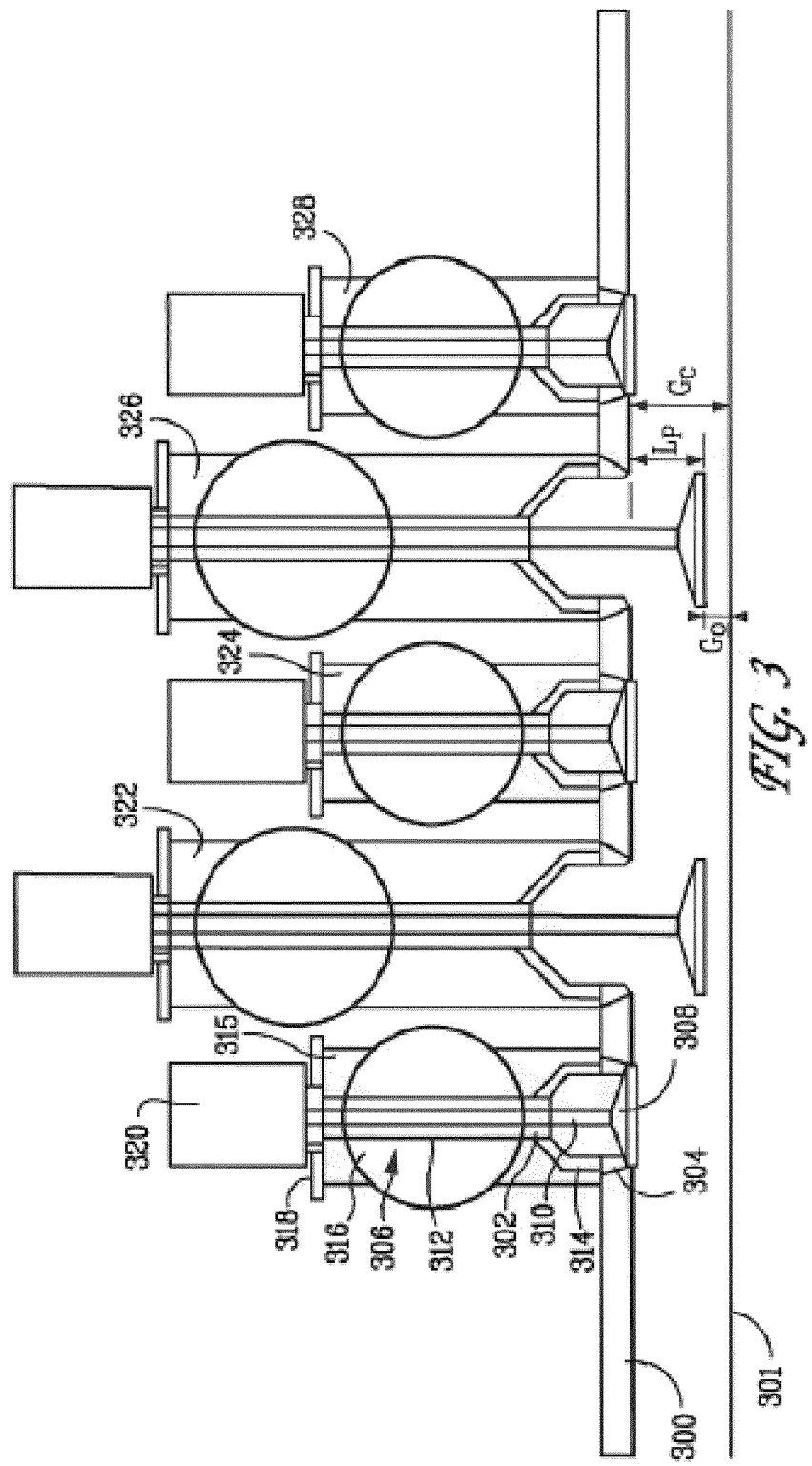
FIG. 3 is an illustration valve assemblies and manifolds as associated with a flat adsorber head for use in the adsorber according to an embodiment of the present invention.

The adsorber in certain embodiments can also be characterized in terms of the distance, or gap, that is created between the poppet and the bed packing For instance, open gap ($G_O$) is the distance between the adsorber bed surface and the flat or profiled surface of the poppet that is facing the proximal adsorber bed surface when the valve is open, and define the closed gap ($G_C$) as the distance when the valve is closed. In many embodiments (such as illustrated in FIG. 3) the difference between these values ($G_C-G_O$) is equal to lift, $L_P$.

The use of poppet valves enables high flow rates by means of the large flow areas that are provided when the valves are opened. Flow area is generally known as the product of the valve circumference ($\pi * D_P$) and valve lift ($L_P$). In poppet valves, as in other valves, there is some reduction of pressure (called pressure drop) that occurs as fluid flows through the valve. Similarly, there is a pressure drop that occurs as fluid flows through the flow path comprising the adsorber internal contents between the valves. A suitable range for the ratio of valve pressure drop to total adsorber pressure drop enables the balancing of opposing factors, with low valve pressure drop preferred for flow distribution within the bed, and high valve pressure drop preferred for high flow rates and smaller/fewer valves. Thus, valve pressure drop is typically between 1% and 100% of the adsorber internal pressure drop, preferably, between 5% and 20% of adsorber internal pressure drop.

Many applications of the poppet valve reverse flow adsorbers are advantageously specified in terms of the poppet valve flow area for each stream as percent of the adsorber flow area, with each stream's poppet valve flow area being calculated from the number and character of the poppet valves on that stream, and with adsorber flow area calculated as the cross-sectional area of the adsorber bed that is accepting or discharging the flow. For example, considering a set of $N_{FI}$ poppet valves (where FI=forward inlet) that are serving the stream that is the flow inlet for the forward flow direction, the total poppet valve flow ($A_{PFI}$) area is $N_{FI} * \pi * D_{PFI} * L_{PFI}$. For a typical cylindrical adsorber, with flow along the cylinder's axis, $D_B$ is the bed diameter, and consequently $\frac{1}{4}\pi D_B^2$ is the adsorber flow area. A typical suitable range for the ratio of total stream poppet valve flow area to adsorber flow area balances opposing factors as does pressure drop. The number and size of valves for each particular inlet or outlet stream can be chosen to provide a ratio of poppet valve flow area for a particular inlet or outlet stream to adsorber flow area between 1% to 30%, preferably, between 2% and 20%. In other words, flow through the poppet valve flow area for forward flow inlet or reverse flow outlet can be between 1% to 30%, preferably, between 2% and 20%, as a percentage of adsorber flow area. Many applications of the reverse flow adsorber in some of the embodiments are advantageously specified in terms of the specific poppet valve diameter and lift. Poppet valve diameter ($D_P$) is advantageously specified in proportion to the diameter ($D_B$) of the adsorber flow area. For non-cylindrical adsorber flow area, an equivalent diameter may be computed as (4 A/$\pi$)$^{1/2}$. A suitable range of diameters satisfactorily balances the opposing needs for high flow rates, uniform flow distribution, and minimal complexity. Preferred poppet diameter is not a simple fraction of diameter, but typically varies continuously as bed diameter changes. The range of poppet valve diameters can be between a minimum value ($D_{PMIN}$) and a maximum value ($D_{PMAX}$), wherein these minimum and maximum values are expressed as a function of bed diameter in the following equations:$D_{PMIN}$[in]=0.1484+0.4876*$D_B$[ft] and $D_{PMAX}$[in]=**1.6113+1.8657*$D_B$**[ft].

A suitable range for the ratio of valve lift ($L_P$) to poppet diameter ($D_P$) balances the factors of valve pressure drop, valve efficiency, bed flow uniformity, and improved mechanical complexity. Valve lift ratio ($L_P/D_P$) is typically between 3% and 25%, preferably, between 5% and 20%.

Further to the above-described dimensions for poppet flow area, diameter, and lift, poppet flow area can be related to diameter, lift, and number of valves by the following geometric equation: $A_{PFI} = N_{FI} * \pi * D_{PFI} * L_{PFI}$ (example for one stream; FI subscript represents forward inlet). The number of valves suitable in an adsorber is the result of adsorber design according to specifications made for other parameters. Design according to the specification provided herein results in valve numbers that balance several opposing objectives. Use of fewer valves leads to those valves being larger to satisfy flow area requirements. Larger valves require larger lifts and larger valve-bed gaps ($G_O$), thus increasing the distance between the adsorber head and the adsorber bed resulting in more open flow path volume. Too many valves in themselves add to adsorber costs in addition to requiring more intricate manifolds. Exemplary designs incorporating these features can be found in Examples 1 and 2, as well as FIGS. 1 and 2.

Adsorbers in one or more embodiments of the present invention allow for an unexpectedly small gap in between the valve assembly and the entry into the adsorber bed. Minimizing this gap advantageously minimizes adsorber open flow path volume which is deleterious to reverse-flow adsorber efficiency. Open flow path volume is associated with the space between the adsorber beds and the valves. Open flow path volume is lacking of any substantial amount packing, or heat transfer solids, and thus provides essentially no contribution to the gas stream treating that occurs within the adsorber. However, fluids within the open flow path volume are still within the flow path and thus may be transferred from one step to the next when the flow direction is reversed or else may require purging fluid to be recovered before the flow direction is reversed. One or more embodiments of the present invention reduce open flow path volume resulting in lower purging requirements and/or lower product losses from one step to the next. Critical heat transfer properties of the packing used are well known in the pressure swing reforming art and result in unexpected flow distribution properties when poppet valves are used and positioned as specified in the present invention. Distribution space, characterized as the height between the open poppet valve and the adsorber bed surface, may be minimized in the adsorber. The bed-to-poppet height ($G_O$) for inlet valves is typically from 20% to 80% of the diameter of the poppet. Because good flow distribution is less of a concern for outlet or exhaust valves, the minimum bed-to-poppet height can be less than for the inlet or intake valves. Typically, the bed-to-poppet height ($G_O$) for outlet valves ranges from 5% to 80% of poppet diameter. These values represent attractive minimum gap dimensions. Larger gaps may be used to accommodate other adsorber internals, such as bed supports or fuel distribution systems.

Valve lift times in a representative example of an industrial diesel engine are approximately 0.004 seconds (4 milliseconds). Typically these valves are opened utilizing a cam shaft, and the valve opens over a certain crank angle, typically going from fully closed to fully open in approximately 25 degrees of crankshaft rotation. The valves that are used in the adsorber may open utilizing a pneumatic actuator and can be held in the fully open position for a length of time before closing. The opening and closing time for the valves is based on the total cycle time for the adsorber. Poppet valves as used in some of the embodiments of the present invention have lift times that are unanticipated in the poppet valve engine art. Valve opening timing is distinguished because the rate of valve opening controls velocity changes within a reverse-flow bed system, and these changes impact the bed performance and durability. Valve lift times that are too fast, such as those used in engines, are undesirable in the present techniques because such times result in too-rapid changes in bed velocity. Typically, the lift times of the valves may be greater than 50 milliseconds, e.g., between 50 and 1000 milliseconds, preferably between 100 and 500 milliseconds. The duration of a complete cycle is defined as $\tau$, and the total lift of the valve is defined as $\lambda$. Typically, a process employing adsorbers uses a set of two or more adsorbers such that one or more adsorbers are operating in the forward direction while one or more other adsorbers are operating in the reverse direction. A single adsorber may remain in a forward or reverse flow step for a duration of about 15% to about 80% of the total cycle time ($\tau$), depending on the number of adsorbers and design of the cycle. The lift times of the valves can range from $0.01\tau$ and $0.05\tau$.

As earlier noted, in a second aspect the present invention relates to an adsorber comprising: a) an adsorber body partially enclosing an adsorption and/or heat exchange region comprising two substantially opposing open ends; b) a first head capping one end of the adsorber body; c) a second head capping the opposing end of the adsorber body; d) a fixed bed comprising a region proximal to the first head, a region proximal to the second head and a central region disposed therebetween, which fixed bed is disposed within the adsorber body and comprises solid material capable of promoting adsorption and/or heat exchange with a gas stream; e) at least one gas stream inlet associated with the first head opening a pathway through the first head and into the adsorber body and at least one gas stream outlet associated with the second head opening a pathway from the adsorber body and through the second head; f) at least one inlet poppet valve controlling the gas stream inlet and integrated with the head associated with the inlet, the inlet poppet valve comprising a linearly actuatable valve stem; g) at least one outlet poppet valve controlling the gas stream outlet and integrated with the head associated with the outlet, the outlet poppet valve comprising a linearly actuatable valve stem; and h) at least one actuator engageable with the linearly actuatable valve stem of f) and/or g) providing valve opening and closing by imparting linear motion to the poppet valve to allow gases to pass from outside the adsorber to inside the adsorber body, and from inside the adsorber body to outside the adsorber so as to provide changeable flow operation.

In certain embodiments of this aspect, the adsorber further comprises i) at least one gas stream inlet associated with the second head opening a pathway through the second head and the adsorber body and at least one gas stream outlet associated with the first head opening a pathway through the adsorber body and the first head, with associated inlet poppet valve(s) or other inlet flow control means, outlet poppet valve(s) and actuator(s) analogous to f), g) and h).

A third aspect, earlier noted, relates to a process for rapid stream-switching of at least two streams in a reverse-flow adsorber comprising an adsorber body partially enclosing an adsorption and/or heat exchange region comprising two substantially opposing open ends with a first head capping one end of the adsorber body, a second head capping the opposing end of the adsorber body, a fixed bed disposed within the adsorber body comprising solid material capable of promoting adsorption and/or heat exchange with a gas stream. The process comprises: i) introducing from one or more inlet gas sources at least one first gas stream to at least one gas stream inlet associated with the first head through the first head and into the adsorber body and withdrawing a treated first gas stream from the adsorber body and through the second head to at least one gas stream outlet associated with the second head; wherein said introducing and withdrawing are controlled respectively by at least one intake poppet valve located in the first head and at least one exhaust poppet valve located in the second head; and ii) introducing from one or more inlet gas sources at least one second gas stream to at least one gas stream inlet associated with the second head through the second head and into the adsorber body and withdrawing a treated second gas stream from the adsorber body and through the first head to at least one gas stream outlet associated with the first head, wherein said introducing and withdrawing are controlled respectively by at least one intake poppet valve or other intake flow control means located in the second head and at least one exhaust poppet valve located in the first head.

In one or more embodiments, the apparatus cycles at a rate of from 0.1 to 20 cycles per minute, preferably 1 to 15 cycles per minute, and pressure swings at total pressures ranging from 0 to 5000 kPa. The adsorber of the present invention is able to reliably perform in these environments.

An exemplary embodiment is shown in FIG. 1 below. FIG. 1 is an illustration of an asymmetric reverse flow adsorber with a single head and associated valve assembly according to an embodiment of the present invention. The adsorber 101 comprises an adsorber body 102 with an adsorber bed 103 having a substantially gas impermeable partition 104 dividing the adsorber bed into left side adsorber bed 105 and right side adsorber bed 106. The upper portion of the adsorber bed is capped by a single head 107 up to which the partition 104 extends. Inlet opening 108 in the head 107 is positioned above the left side adsorber bed 105 and fed by a first conduit 109. A conduit, such as conduit 109 and 115 may be a tube or other fluid conveying means provided as a portion of or extension from a manifold (not shown). A conduit, such as conduit 109 and 115 may extend from outside head 107 to at least partially through said head. The first conduit 109 may extend from outside the adsorber body 102 and through an opening in the head 107 towards the left side adsorber bed 105. A forward flow inlet poppet valve 110 is seatable within the head contacting a separate valve seat inserted within the head (not shown) or the head itself when seated, and controls fluid flow from outside the head into the left upper open space 111 above the left side adsorber bed 105. The inlet poppet valve 110 is upwardly extended in the closed retracted position and is open when downwardly extended. When the inlet poppet valve 110 is open, fluid flows forward from the first conduit 109 through the inlet poppet valve 110 into a flow path via the open space 111 through the left side adsorber bed 105 into a lower common open space 112 below the adsorber bed 103 and then to the right side adsorber bed 106 and right upper open space 113 from which the flow path extends to forward flow outlet poppet valve 114 is seatable within the head 107 and contacts a separate valve seat (not shown) or the head itself when seated. The outlet poppet valve 114 which is seated within the head 107 controls flow from the right upper open space 113 to a second conduit 115 extending from the outlet poppet valve 114 through the head to a location outside the head. Like the inlet poppet valve 110, the outlet poppet valve 114 is upwardly extended in the closed retracted position and is open when downwardly extended. (An alternate arrangement can be made wherein the inlet poppet valve 110 and outlet poppet valve 114 are downwardly extended in the closed position and extend upwardly away from the adsorber bed in the open position.) The second conduit 115 can be a tube or other fluid conveying means provided as a portion of or extension from a manifold (not shown)). The second conduit 115 may extend from outside the adsorber body 102 and through an opening in the head 107 towards the right side adsorber bed 106 and may be used to conduct products from the adsorber bed 103 to a location outside the adsorber 101.

During operation, the inlet poppet valve 110 and outlet poppet valve 114 are substantially in phase, i.e., they open and close together substantially at the same time. Thus, when open they allow for fluid flow from the first conduit 109 to the second conduit 115. A corresponding set of valves and conduits (not shown) can provide a reverse flow along the flow path through the adsorber bed in the reverse direction, with a reverse flow inlet valve over the right side adsorber bed 106 and a reverse flow outlet valve over the left side adsorber bed 105. The second set of valves also typically operates substantially in phase with regard to each other, while operating in substantially opposite phase with the first set of valves. Thus, the first and second valves (the first valve pair) are simultaneously open while the third inlet poppet valve and fourth outlet poppet valve (the second valve pair) are closed when flow is in the forward direction (from the left side of the adsorber to the right). The first and second valves of the first valve pair are then closed while the second valve pair is open to permit flow in the reverse direction.

In an alternative embodiment, the advantages of employing a particularly symmetric valve pattern may dictate a valve diameter that is larger than the DPMAX that would be chosen without considering symmetry. For example, one may use a hexagon pattern of six or seven valves associated with the circular end of a cylindrical adsorber bed design. If center to center valve spacing is ≥120% of valve diameter, then valves could be as large as 27.8% of reactor diameter. Further, when center to center valve spacing is ≥140% of valve diameter, then valves could be as large as 23.8% of adsorber diameter. As an example, an adsorber bed that is 96 inches (2.44 meters) in diameter may benefit from a valve that is 22.85 or 26.7 inches (58 or 67.8 cm) in diameter. For such embodiments, the DPMAX may be a larger proportion of adsorber diameter, as given by the equation (DPMAX) [inches]=1.6113+ 2.858*DB [feet] or (DPMAX) [cm]=4.0927+0.238*DB [cm]. As may be appreciated, other variations may also be envisioned within the scope of the present techniques.

Asymmetric reverse flow operation typically requires that the composition of gas flowing in the forward direction differ from the composition of gas flowing in the reverse direction. For example, the gas flowing through the intake valve in the forward direction differs from the composition of gas flowing through the intake valve in the reverse direction.

Figure 2:
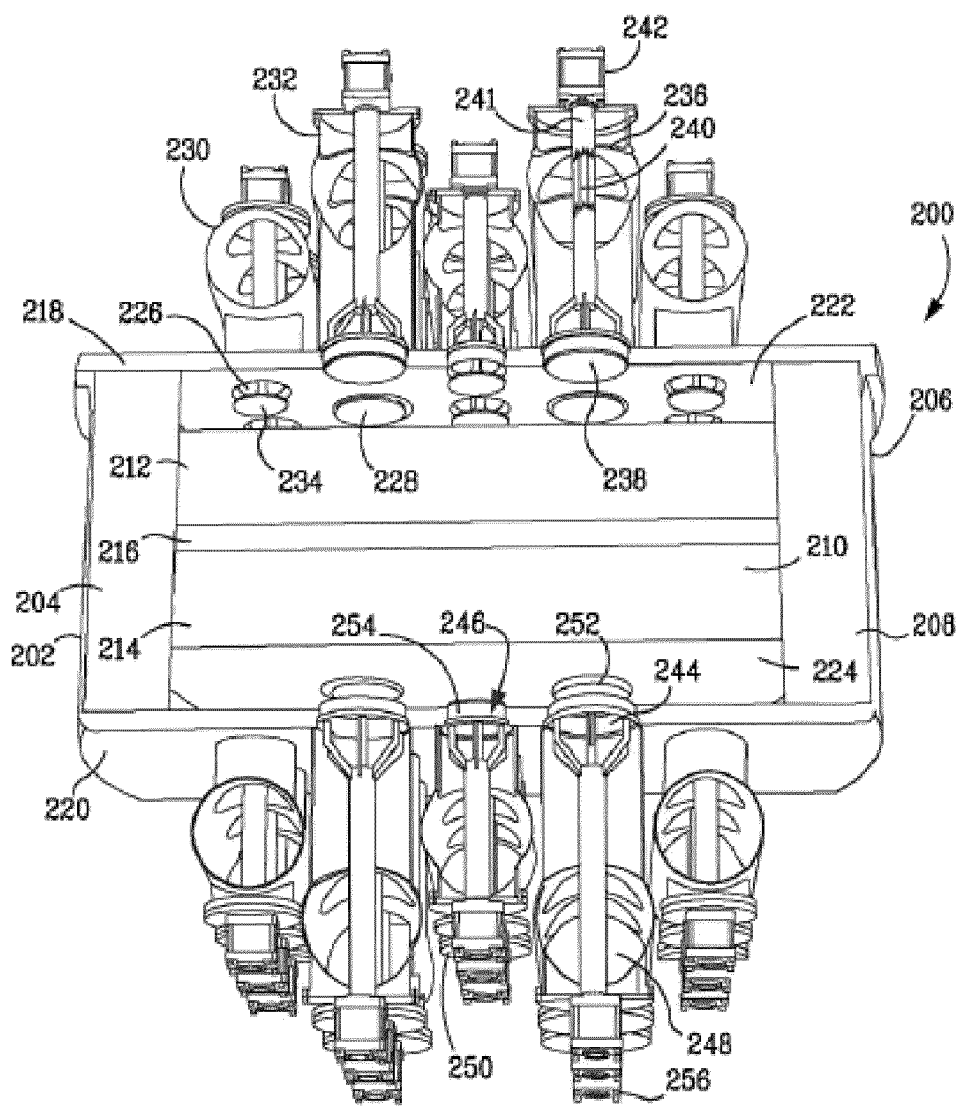
FIG. 2 is an illustration of an asymmetric adsorber with opposing flat heads and associated valve assemblies and manifolds according to an embodiment of the present invention.

An exemplary embodiment of the present adsorber, as applied to a large-scale adsorber having multiple valves and conduits, is shown in FIG. 2 below. FIG. 2 is an illustration of an asymmetric reverse flow adsorber with two opposed heads and associated valve assemblies according to an embodiment of the present invention. The adsorber 200 comprises a cylindrical wall and cylindrical insulation layer depicted in the cross-sectioned FIG. as left side wall 202, left insulation layer 204, right side wall 206, and right insulation layer 208. An adsorber bed 210 comprises an upper adsorber bed portion 212, a lower adsorber bed portion 214 with a mixing zone 216 which can contain a mixing structure. The adsorber is capped with an upper head 218 and a lower head 220, resulting in an upper open zone 222, and lower open zone 224 which open zones are comprised substantially of open flow path volume. Such open flow path volume in reverse flow adsorbers contains gas that may cross over from the forward flow step of the cycle to the reverse flow step, and vice versa, if not properly managed, for example by flushing between these steps of the cycle. This minimizing of open flow path volume advantageously reduces the volumes which to be managed during a cycle, reducing cycle time and increasing efficiency. The upper head 218 and lower head 220 contain openings in which valve structures can be inserted. The upper or lower open flow path volume between the head and adsorber bed can also contain distribution lines (not shown) which directly introduce fuel for combustion in the adsorber 200.

The upper head 218 contains various openings, such as exemplary openings 226 and 228 (the latter opening depicted as occupied by a poppet valve) for forward flow inlet manifold 230 and reverse flow outlet manifold 232. Disposed through the manifolds and controlling the openings are forward flow inlet valve 234 and reverse flow outlet valve 236. The forward flow inlet valve 234 and reverse flow outlet valve 236 are poppet valves comprising (as depicted in the case of 236) a disk element 238 connected to a stem element 240 which can be positioned within a bushing or valve guide 241. The stem element 240 is connected to an actuating means 242 which imparts linear motion to the valve. As may be appreciated, the openings 226 and 228 and associated manifolds 230 and 232 may form conduits extending from outside the upper head 218 to at least partially through the upper head 218 for fluid flow. This exemplary embodiment advantageously has an independent actuating means associated with each valve which minimizes actuating means failure to a single valve. Alternately, a single actuating means can be provided that controls plural valves. In general, the openings and inlet valves for inlet manifolds are of smaller diameter than those for outlet manifolds, given that the gas volumes passing through the inlets tend to be lower than product volumes passing through the outlets. In FIG. 2, the forward inlet valves are depicted in an open position while the reverse outlet valves are depicted in the closed position.

A similar manifold and valve arrangement is associated with the lower head 220. The lower head 220 contains various openings, such as exemplary openings 244 and 246 for forward flow outlet manifold 248 and reverse flow inlet manifold 250. (Opening 246 is partially obscured inasmuch as the reverse flow inlet valve 254 is depicted in the closed position.) The "tag" to 246 is an arrow, pointing through the reverse flow inlet valve 254 and into the opening 246. The openings 244 and 246 and associated manifolds 248 and 250 may form conduits extending from outside the lower head 220 to at least partially through said lower head 220 for fluid flow. Disposed through the manifolds and controlling the openings are forward flow outlet valve 252 and reverse flow inlet valve 254. Again, the forward flow outlet valve 252 and reverse flow inlet valve 254 are poppet valves comprising a disk element connected to a stem element which can be positioned within a bushing or valve guide. As shown for forward flow outlet valve 252, the stem element is connected to an actuating means 256 which imparts linear motion to the valve, similar to the discussion above. The embodiment advantageously has an independent actuating means associated with each valve which minimizes actuating means failure to a single valve. Alternately, a single actuating means can be provided that controls plural valves operating in phase, preferably, a group of plural reverse flow inlet valves. Part of the adsorber valve design includes sealing the adsorber, specifically around the valves, to eliminate release of product gases. Suitable seals include rod packing, e.g., reciprocating compressor type seals for the stem elements or shafts of the valves. Valve actuator means provides adequate force and lift times, and meets the design life of the adsorber. Typically, the actuator means are pneumatically controlled actuators that are spring returned and are biased to closure in the event of actuator failure.

In FIG. 2, the reverse flow outlet valves 236 are depicted in the closed position while the forward flow inlet valves 234 are depicted in an open position. Thus, FIG. 2 depicts gas in forward flow from the forward flow inlet manifold 230 of the upper head 218, through the adsorber bed 210 and into the forward flow outlet 244 of the lower head 220. Both reverse flow valves (reverse flow outlet valve 236 and reverse flow inlet valve 254 are closed at this time. In the next phase of the cycle the forward flow inlet valves (234 and 252) close and the reverse flow inlet valve 254 of the lower head opens along with the reverse flow outlet valve 236 of the upper head 218, promoting reverse flow of gas from the lower head 220 through the adsorber bed 210 and out the upper head 218.

Typically, the forward flow valve pairs, with each valve pair consisting of a forward flow inlet valve and forward flow outlet valve operate together in phase with each member of the pair. A forward flow valve pair can be located on their respective heads directly opposite each other with stems parallel to the adsorber sides and driven by a common actuator means. Similarly, the reverse flow valve pairs, with each valve pair consisting of a reverse flow inlet valve and a reverse flow outlet valve operate in phase with each other and can, if desired, be located in their respective heads directly opposite each other with their stems parallel to the adsorber sides and driven by a common actuator means. Generally, forward flow valve pairs operate directly opposite with reverse flow pairs, such that when a forward flow valve pair is open, the reverse flow valve pair is closed, and vice versa. Where each valve on the adsorber has its own actuator means, the adsorber can continue to operate if only a single valve fails and allows the removal and replacement of a single valve without the need to disassemble the entire adsorber. Alternately, plural valves that control the same feed/product stream can be driven by a common actuator.

The adsorber bed 210 comprises an upper adsorber bed portion 212, a lower adsorber bed portion 214 with a mixing zone 216 which can contain a mixing structure. The lower adsorber bed may also include structures that support the weight of the bed (not shown). Typical adsorber bed materials include honeycomb monoliths, which have straight channels to minimize pressure drop and enable greater adsorber length. Honeycomb monoliths used in the adsorber typically have channel densities that range from about 16 channels per inch$^2$ (channels/in$^2$) to about 3200 channels/in$^2$ (2.5-500 channels/cm$^2$). Alternatively, packing for one or more portions of beds 212 and 214 may be more tortuous, such as foam monoliths and packed beds. Typical foam monoliths for the present techniques have pore densities that range from about 5 ppi (pores per inch) to about 100 ppi (i.e. 2-40 pore/cm). Typical packed beds for the present techniques have packing with wetted surface area that range from about 60 per feet (ft$^{-1}$) to about 3000 ft$^{-1}$ (i.e. 2-100 cm$^{-1}$). The total flow path in FIG. 2 is represented by the volumes in open zones 222 and 224 as well as volumes in beds 212 and 214 and in mixer 216. Open flow path volume is comprised mostly of the open zones 222 and 224, while packed flow path volume is comprised mostly of the bed and mixer zones 212, 214, and 216.

The integration of large poppet valves into the heads of the adsorber greatly reduces, relative to conventional valving, the amount of unproductive volume between the adsorber bed and the valve. Moreover, this embodiment is readily constructed and operated, with a sufficient number of valves arranged on an adsorber head to provide sufficient flow area to allow operation at desired pressure drop, typically a valve pressure drop between 1% and 100% of the adsorber internal pressure drop, preferably, between 5% and 20% of adsorber internal pressure drop. Adsorber internal pressure drop, in the context of FIG. 2, may comprise the difference in pressure between the upper open zone 222 and the lower open zone 224. Valve pressure drop, in the context of FIG. 2, comprise the difference in pressure between a manifold (e.g. 230) and the open zone (e.g. 222) just beyond an open valve (e.g. 234). As stated earlier, valve pressure drop is typically between 1% and 100% of the adsorber internal pressure drop, preferably, between 5% and 20% of adsorber internal pressure drop. Moreover, flow emerging from the valves can be adequately distributed over the entire width of the bed. This embodiment can be used with an adsorber bed substantially comprising parallel channels in the direction of flow as noted in the preceding paragraph, e.g., honeycomb monoliths which can eliminate any radial dispersion of streams. Advantaged reverse-flow adsorber technology provides high velocity uniformity across the bed cross-section, for example as quantified via the standard deviation of velocity so that residence times in axial paths through the bed may be similar. In particular, reverse flow adsorber technology used for pressure swing reforming requires a high degree of flow distribution in the open volume outside of the adsorber bed packing, because the parallel channel components, e.g., those in honeycomb structures, limit further redistribution of flow once inside the bed. The present techniques are particularly useful in providing a head-integrated poppet valve adsorber that distributes flow from integrated poppet valves into a parallel channel honeycomb bed packing.

FIG. 3 illustrates a detailed vertical cross-section of the adsorber upper head 300 showing associated integral valve assemblies in place within the manifolds, above an adsorber bed surface 301. Forward flow inlet valve assembly 302 comprises valve seating means 304 which interfaces between the head and valve assembly and is attached into an opening in the head to provide a forward inlet opening in the head. The forward flow inlet valve assembly 302 further comprises a poppet valve 306 having a disk element 308 connected to a stem element 310 which is surrounded in part by a hollow cylindrical valve guide member 312 from which extend support arms 314 which connect the valve seating means to the valve guide means. The forward flow inlet valve assembly 302 extends through a vertical manifold tube 315 acting as a delivery tube to the valve opening. The vertical manifold tube 315 intersects with a horizontal manifold tube 316 through which inlet gas is conducted to the valve and therethrough ultimately introduced to the adsorber bed 301. Fluid flows from the horizontal manifold tube 316 and vertical manifold tube 315 at least partially through the opening in the head 300 which provides a conduit for fluid flow from outside head 300 to at least partially through said head, with flow continuing past the valve seating means 304 when the poppet valve 306 is in an open position. The conduit may include the valve seating means 304, hollow cylindrical valve guide member 312, vertical manifold tube 315, horizontal manifold tube 316, valve actuating member 320 and/or assembly's collar 318 for inlet valve assembly 302. The vertical manifold tube 315 is capped by the valve assembly's collar 318 through which extends the valve guide member 312 and valve stem member 310. Atop the collar 318 is a valve actuating member 320 which pneumatically controls the linear movement of the valve stem element and thus the passage of fluid through the forward flow inlet opening that is surrounded by the valve seating means 304. A larger diameter reverse flow outlet valve assembly 322 is attached at a reverse flow outlet opening in the upper head. Valve assemblies 324, 326, and 328 represent additional valve assemblies, namely, a forward flow inlet valve assembly 324, a reverse flow outlet valve assembly 326, and another forward flow inlet valve assembly 328, respectively. Each additional valve assembly is analogous to the forward inlet valve assembly described above. Forward flow inlet valve assemblies 320, 324, and 328 are shown with their valves in the closed position while reverse flow outlet valve assemblies 322 and 326 are shown with the valve in the open position, showing $L_P$, or lift, $G_O$, or open gap, and $G_C$, or closed gap.

Each valve assembly comprises, a valve seat, a disk that mates up with the valve seat, a stem that is attached to the disk, a guide for the stem, an attachment structure from the valve seat to the guide, linear bearings, seal systems, and an actuator. The valve seat may be attached to the guide and assembled prior to installing into the head, may be pressed or threaded into the head, or may be machined into the head, as in the case where an integral head that included the manifold and valves may be utilized. The disk may be circular, elliptical, hemispherical, or any desired shape that allows for the attachment of a stem to actuate the disk. The circular or elliptical disk may be the most efficient shape. The guide for the valve stem includes the linear bearings and the seals for the valve stem.

The actuator may be an electromagnetic actuator, pneumatic actuator, hydraulic actuator, or a cam shaft that rotates at the rate desired for the process which is dependent on cycle times. The actuator may impart motion to several valves simultaneously or may impart motion to each valve individually. In the case where the valve seat is attached to the guide, the valve assembly, which may include the components listed above, can be readily removed from the adsorber head as a unit facilitating the repair of the adsorber should valve assembly replacement be necessary. The assembly can be attached into the adsorber head by a bolt on flange at the top of the manifold. Alternatively, a turn-to-lock type (or bayonet) system where the valve assembly is inserted and the valve assembly is turned until it locks into place. This, however, is less preferred for larger valves and higher temperature streams.

In alternate embodiments, each integral valve assembly comprises, a valve seating means securable to the opening in the head, support arms securing the valve seating means to a hollow valve guide, a valve stem element within the valve guide secured to a disk member whose linear adjustment varies flow into the adsorber, a collar surrounding the valve guide which collar is securable to the upper opening of a vertical manifold tube, atop which is positioned the actuating member which imparts linear movement to the valve stem element to which it can contact. Each integral valve assembly can be readily removed from the adsorber head as a unit, facilitating the repair of the adsorber should valve assembly replacement be necessary. Valve seat assemblies are typically attached to the head via a flange at the top of the manifold, with the integral assembly being lowered down into position through the manifold. This arrangement requires the valve assembly to be sealed in three places. The flange is sealed with a gasket, the valve stem is sealed using a reciprocating compressor seal, and the valve seat to the head of the adsorber is sealed using a lip seal. An alternate means to attach and seal the valve assembly into the adsorber may be a turn-to-lock type (or bayonet) system where the assembly is inserted and the entire assembly is turned until it locks into place. This, however, is less preferred for larger valves and higher temperature streams. In some embodiments of the invention, particularly where the valve opens into the manifold rather than into the adsorber, or where the head is removable for installation and removal of the valve, the valve seat is installed in the head separate from the valve assembly, by use of threaded-in or pressed-in seats, or by the machining of the valve seat into the head itself. Non-integral valve assemblies like those in an automotive type engine can also be used.

Figure 4:
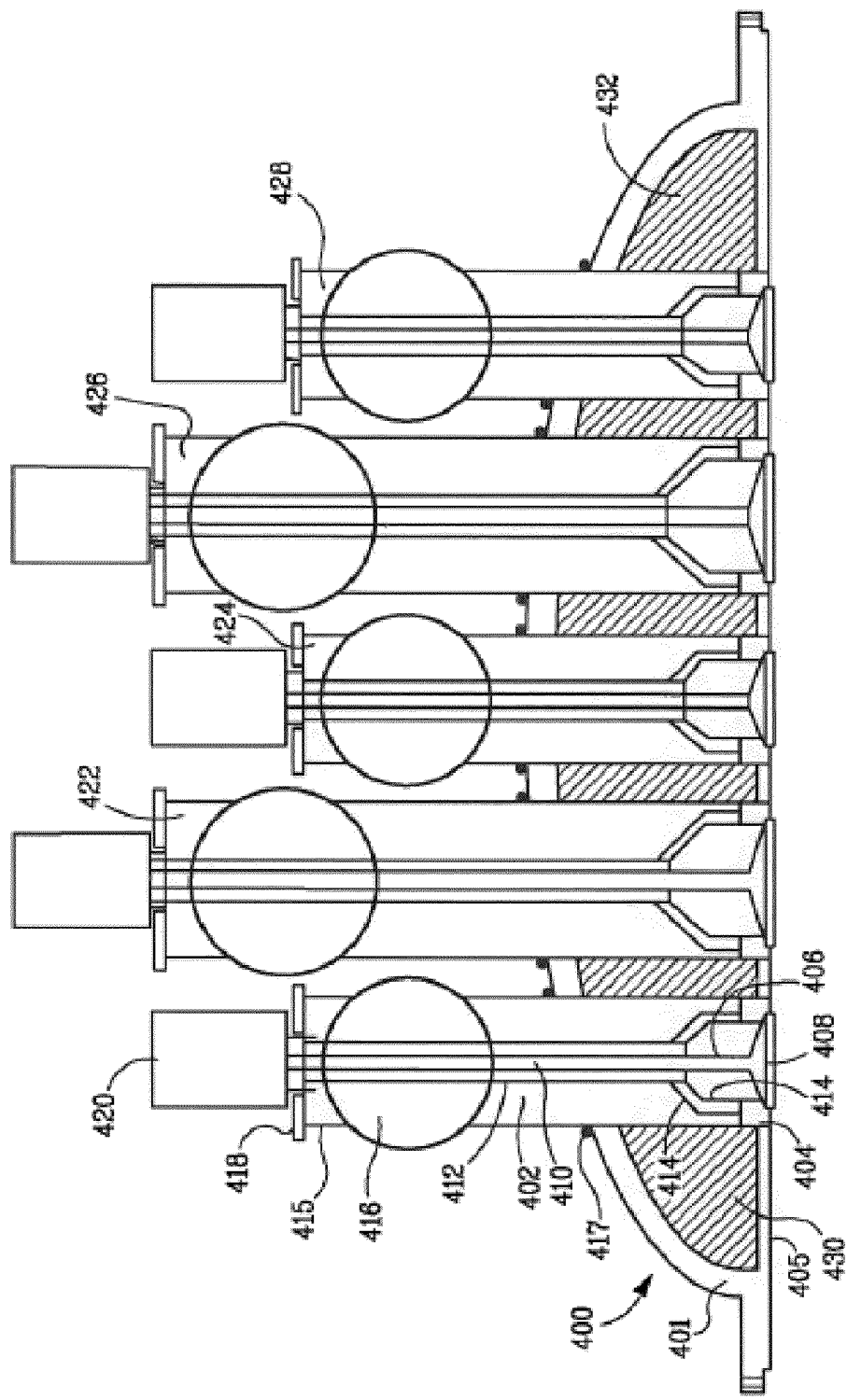
FIG. 4 is an illustration valve assemblies and manifolds incorporated in a dished elliptical head of an asymmetric reverse flow adsorber according to an embodiment of the present invention.
Figure 5:
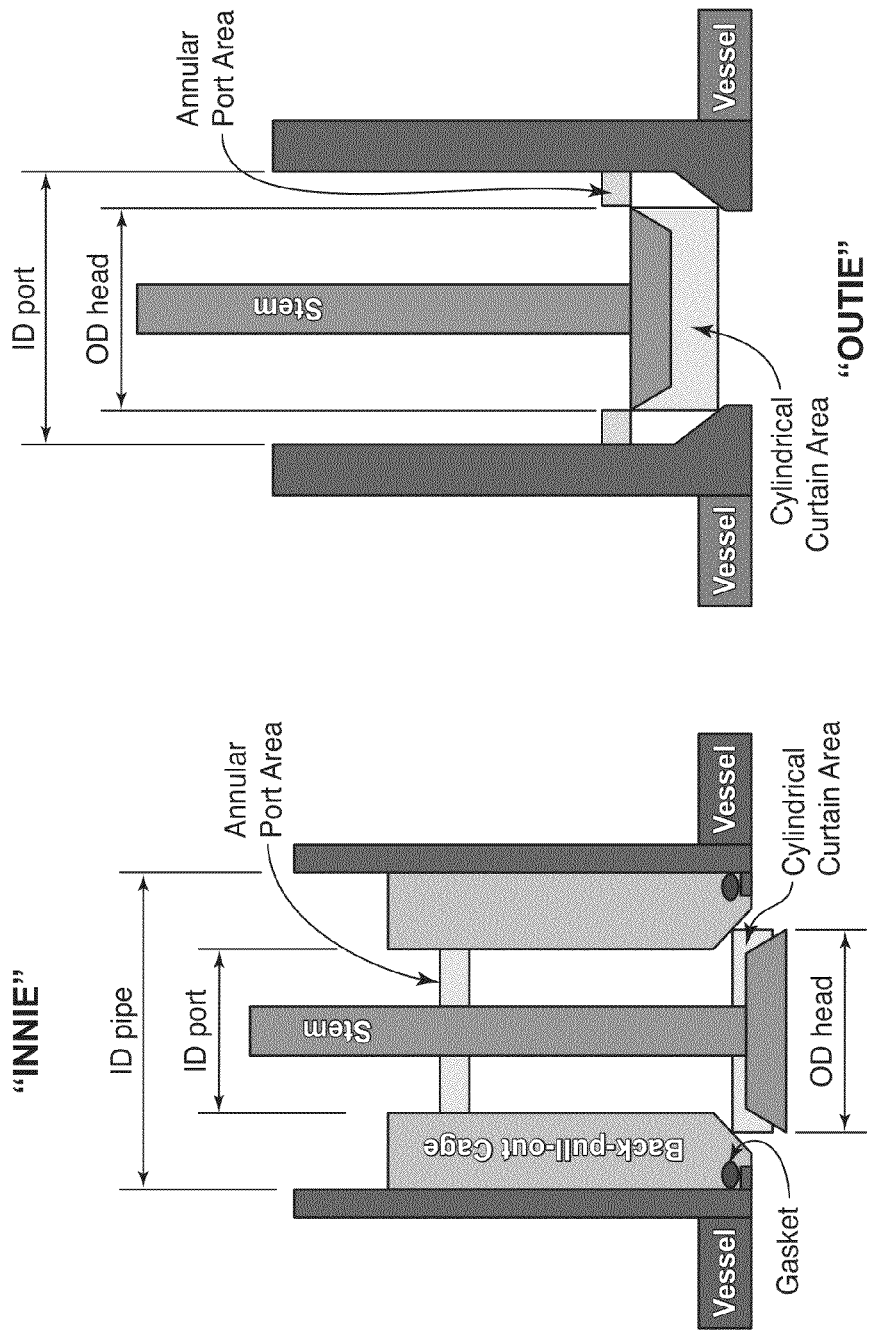
FIGS. 5A and 5B are exemplary poppet valves.
Figure 6:
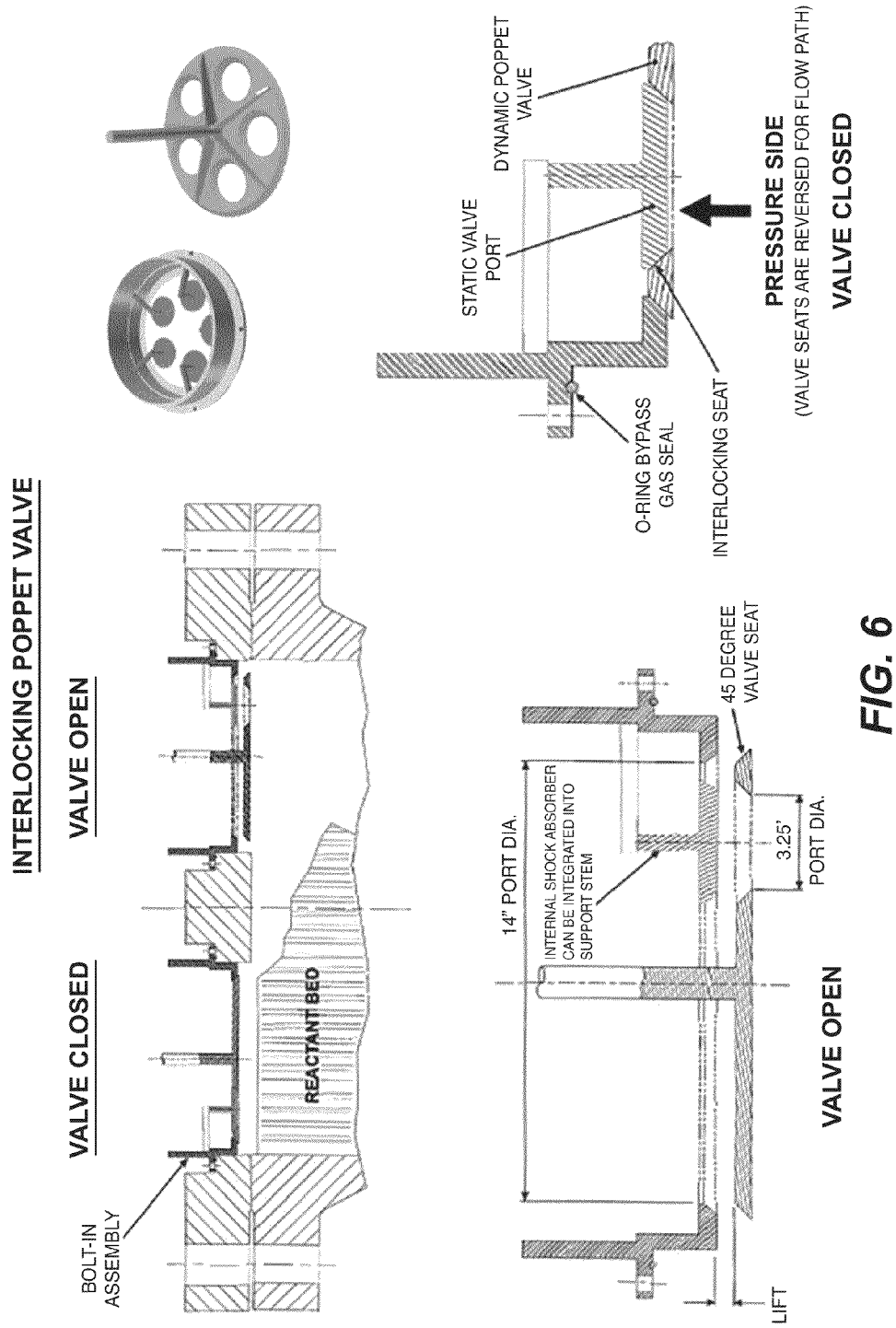
FIG. 6 shows exemplary poppet valves.
Figure 7:
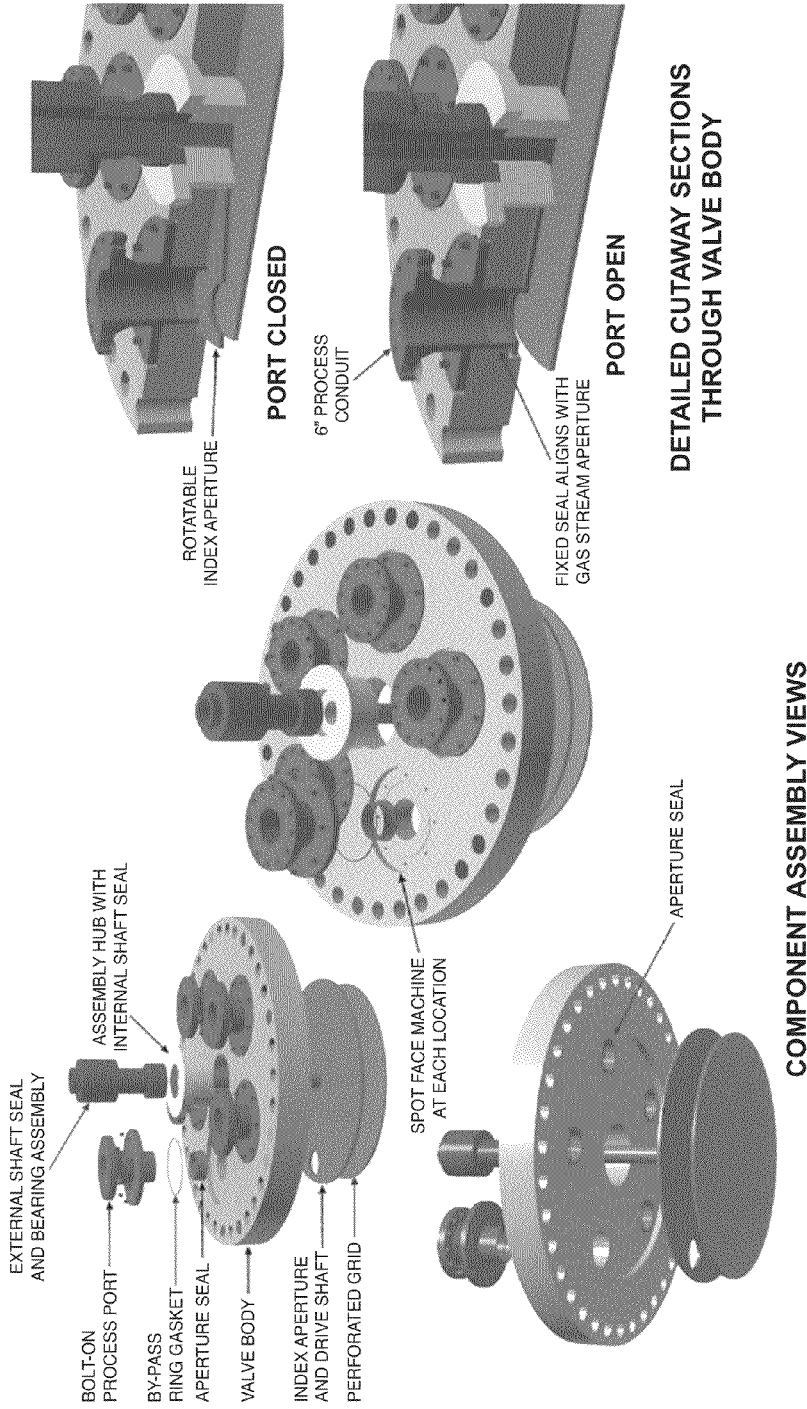
FIG. 7 shows exemplary poppet valves.
Figure 8:
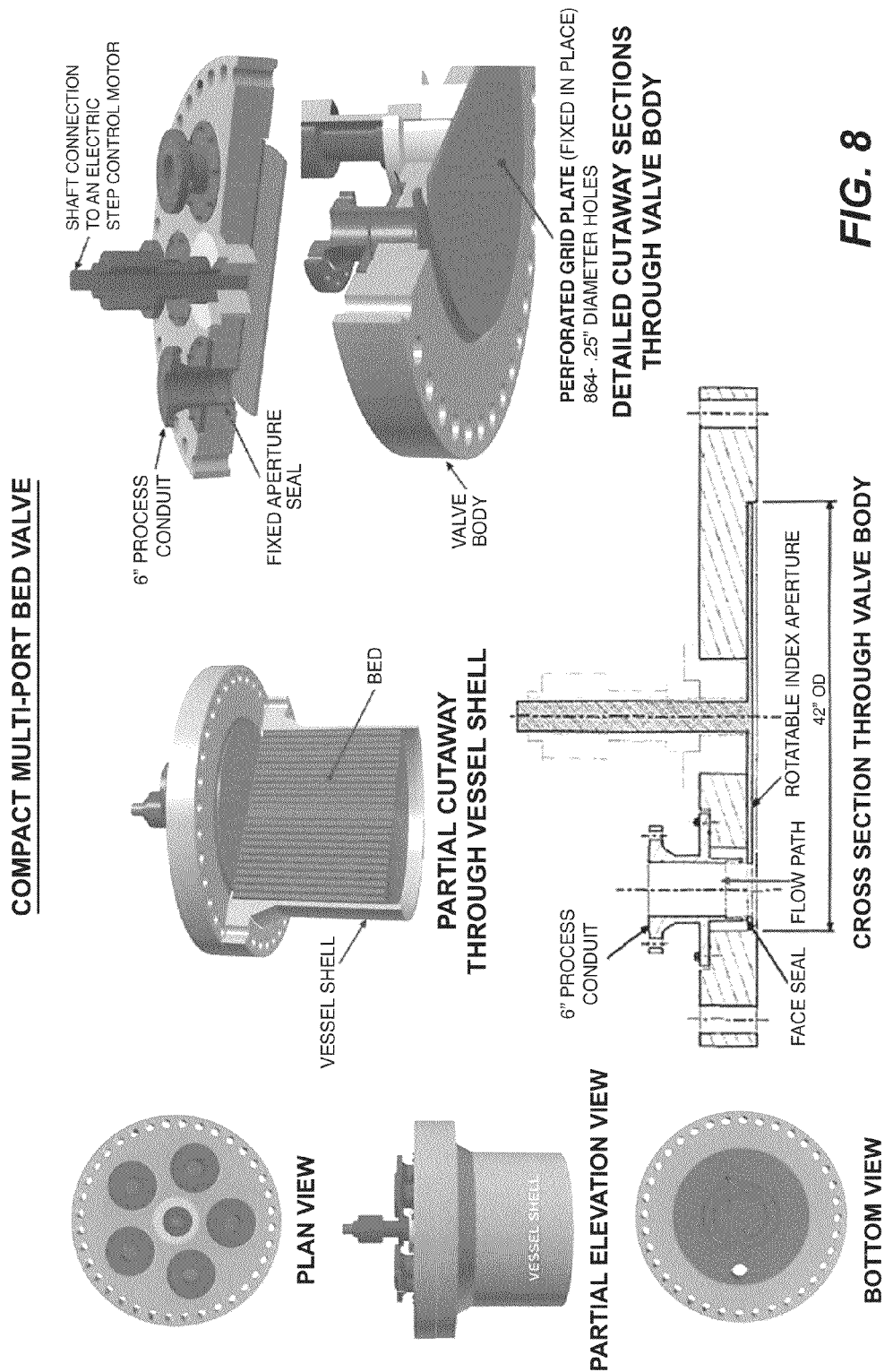
FIG. 8 shows exemplary poppet valves and adsorption beds.
Figure 9:
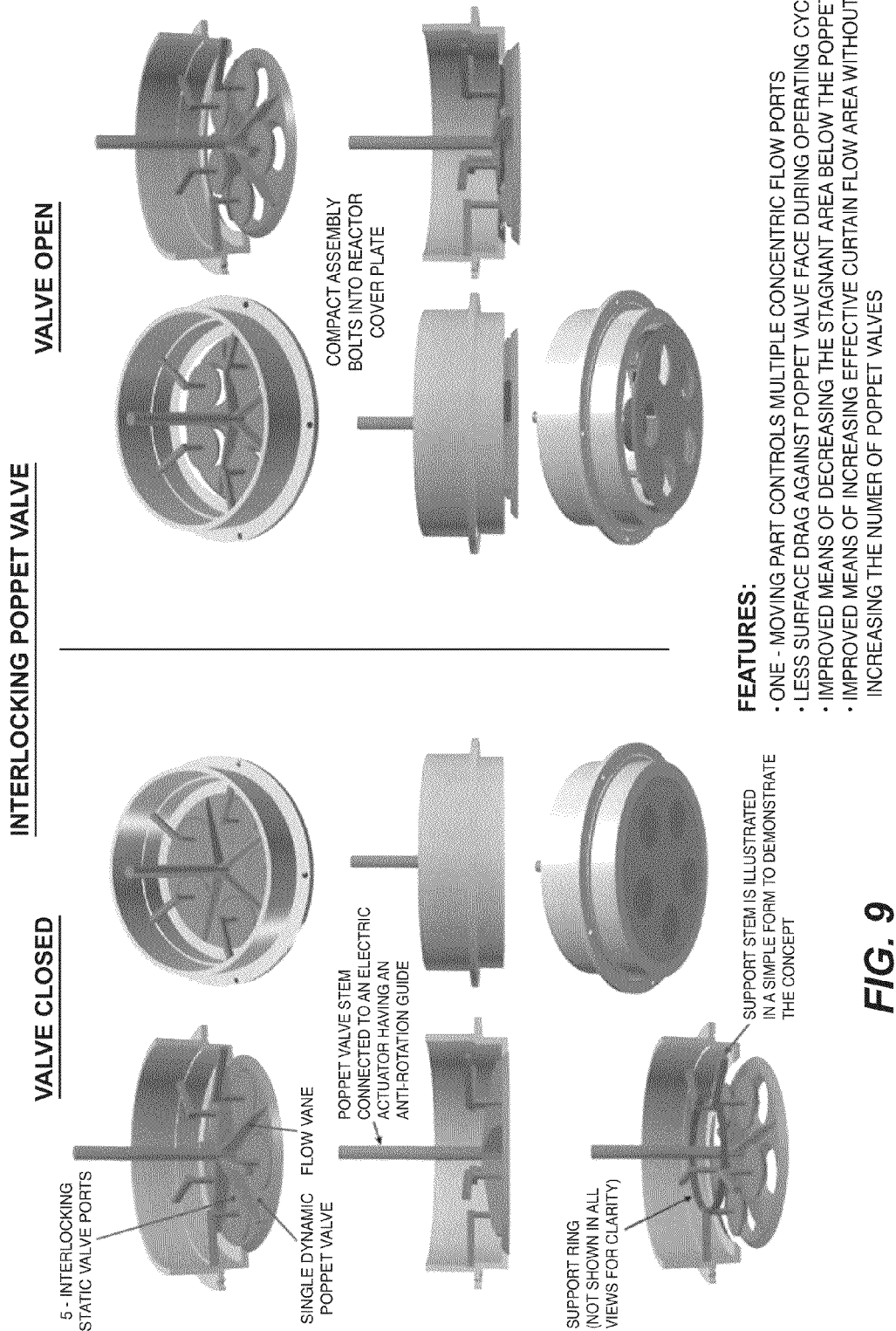
FIG. 9 shows exemplary poppet valves.

FIG. 4 depicts a detailed vertical cross-section of a dished, substantially elliptical upper head 400 along with associated integral valve assemblies in place within an associated manifold. The exterior of the head is defined by a substantially elliptical external wall 401 which is of sufficient thickness to contain operating pressures encountered during use. Forward flow inlet valve assembly 402 comprises valve seating means 404 which is attached at a forward inlet opening in the flat floor 405 of the head which abuts the adsorption zone of the adsorber and provides a barrier. This flat floor 405 provides a surface on which to attach the valve seating means 404, but does not operate as a pressure boundary. The forward flow inlet valve assembly 402 further comprises a poppet valve 406 having a disk element 408 connected to a stem element 410 which is surrounded in part by a hollow cylindrical valve guide member 412 from which extend support arms 414 which connect the valve seating means to the valve guide member 412. The forward flow inlet valve assembly 402 extends through a vertical manifold tube 415 acting as a delivery tube to the valve opening in the floor 405. The vertical manifold tube 415 intersects with a horizontal manifold tube 416 through which inlet gas is conducted to the valves and therethrough ultimately introduced to the adsorber bed (not shown). Fluid flows from the horizontal manifold tube 416 and vertical manifold tube 415 at least partially through the opening in the flat floor 405 which provides a conduit for fluid flow past the valve seating means 404 when the poppet valve 406 is in an open position. This conduit extends from outside head 400 to at least partially through said head, and may include all or parts of the valve seating means 404, valve guide member 412, vertical manifold tube 415, horizontal manifold tube 416, valve actuating member 420 and/or assembly's collar 418 for inlet valve assembly 402. The vertical manifold tube 415 can be secured to the elliptical external wall 401 by welds 417 and is capped by the valve assembly's collar 418 through which extends the valve guide member 412 and valve stem member 410. Atop the collar 418 is a valve actuating member 420 which pneumatically controls the linear movement of the valve stem element 410 and thus the passage of fluid through the forward inlet opening that is surrounded by the valve seating means 404. A larger diameter reverse flow outlet valve assembly 422 is attached at a reverse flow outlet opening in the upper head. Valve assemblies 424, 426, and 428 represent additional valve assemblies, namely, a forward flow inlet valve assembly 424, a reverse flow outlet valve assembly 426, and another forward flow inlet valve assembly 428. Each valve assembly is similar to the forward inlet valve assembly described above in detail. The open space between the external elliptical wall 401 and the flat floor of the head 405 and between the vertical manifold tubes can be filled with a suitable space filling solid, e.g., a low porosity material with adequate temperature resistance, preferably a low porosity ceramic material, to avoid the undesired buildup of gases within the head itself, as shown at 430 and 432.

In other embodiments, the adsorber may include other configurations in addition to the head and adsorber body or shell, noted above. For instance, the adsorber body may be formed of one unit or different components, which form an adsorption zone within the adsorber body. Further, the one or more poppet valve assemblies may be coupled to the directly to adsorber body or may be coupled to other conduits that are coupled directly to the adsorber body or the head. Accordingly, in one embodiment, an adsorber may include an adsorber body, wherein the adsorber body forms a adsorption zone within the adsorber body; a packing material disposed within the adsorption zone; and one or more poppet valve assemblies coupled to the adsorber body and in flow communication with the adsorption zone and controlling fluid flow between a location external to the adsorber body and within the adsorption zone. The adsorber body may be one unit, different components, or may be a head and a shell configuration. The operation of the adsorber and the poppet valve assemblies may operate as discussed above.

The packing material may include different types of packing material, such as pebbles or engineered packing material, as noted above. If the packing material is engineering packing material it may include material provided in a specific configuration, such as a honeycomb, ceramic foams or the like. These engineered packing materials have a higher geometric surface area ($a_v$), as compared to other bed structures. The use of this type of packing allows for higher gas hourly space velocity, higher volumetric adsorber productivity, higher thermal efficiency, and smaller, more economical adsorbers.

The provided adsorbers are useful in adsorptive kinetic separation processes, apparatus, and systems for development and production of hydrocarbons, such as gas and oil processing. Particularly, the provided processes, apparatus, and systems are useful for the rapid, large scale, efficient separation of a variety of target gases from gas mixtures.

The provided adsorbers described above are useful in swing adsorption processes. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide will be selectively adsorbed by the adsorbent, and the gas exiting the vessel will be enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. %

$CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, bearing docket number2011EM060, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present between the crystals or pores within the adsorbing channel wall is reduced by filling the mesophase pores between the particles to reduce the open volume while allowing rapid gas transport throughout the adsorbent layer. This filling of the non-sweepable void space is desired to reduce to acceptable levels the quantity of desired product, lost during the rapid desorption step as well as to allow a high degree of adsorber bed purity following thermal desorption. Such mesophase pore filling can be accomplished in a variety of ways. For example, a polymer filler can be used with rapid diffusion of $H_2S$ and $CO_2$, such as a silicon rubber or a polymer with intrinsic porosity. Another way can be done by filling the void space with a pyrolitic carbon having mesoporosity and/or microporosity. Still another way would be by filling the void space with inert solids of smaller and smaller sizes, or by filling the void space with a replenishable liquid through which the desired gases rapidly diffuse (such as water, solvents, or oil). Preferably, the void space within the adsorbent wall will be reduced to less than 60 vol. %, preferably to less than 70%, and more preferably to less than 80%;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to unfunctionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4$+ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2$+). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$ from natural gas, this specific class of 8-ring zeolite materials also has a Si/Al ratio from about 2 to about 1000, preferably from about 10 to about 500, and more from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the remove $N_2$ from natural gas is another advantage offered by this class of 8-ring zeolite materials.

In other instances, it is also desirable to remove $H_2S$ from natural gas which can contain from about 0.001% $H_2S$ to about 70% $H_2S$. In this case, it can be advantageous to formulate the adsorbent with stannosilicates as well as the aforementioned class of 8-ring zeolites that has kinetic selectivity. The kinetic selectivity of this class of 8-ring materials allows $H_2S$ to be rapidly transmitted into zeolite crystals while hindering the transport of methane so that it is possible to selectively separate $H_2S$ from a mixture of $H_2S$ and methane. For the removal of $H_2S$ from natural gas, this specific class of 8-ring zeolite materials has a Si/Al ratio from about 2 to about 1000, preferably from about 10 to about 500, and more from about 50 to about 300. This preferred class of 8-ring zeolites that are suitable for use herein allow $H_2S$ to access the internal pore structure through 8-ring windows in a manner such that the ratio of single component diffusion coefficients for $H_2S$ over methane (i.e., $DH_2S/DCH_4$) is greater than 5, preferably greater than about 20, and more preferably greater than about 50 and even more preferably greater than 100. DDR, Sigma-1, and ZSM-58 are also suitable for the removal of $H_2S$ from natural gas. In some applications the $H_2S$ has to be removed to the ppm or sub ppm levels.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics; and Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor will provide the benefits of rapid adsorption kinetics through minimization of gas film resistance and high gas solid communication. A preferred adsorber design will generate a sharp adsorption front.

It is preferred to have very rapid gas to adsorbent kinetics, i.e. the length through which the target species must diffuse to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing a parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 30 microns for most applications. In the most limiting case of laminar gas flow, the very narrow channels will limit the maximum diffusion distance for a trace species to no more than ½ the diameter of the channel. Even when adsorbing the desired species at the leading edge of the adsorption front, where their concentrations will approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design.

Concept N: A means for rapidly heating and cooling the adsorbent bed structure so that adsorption can occur at a lower temperature and desorption at a higher temperature. The adsorption step will then occur at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs will preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water will be left within the adsorbent wall during the adsorption step, if the thickness of the adsorbent wall is kept small (less than 1000 microns, preferably less than 200 microns, and most preferably less than 100 microns) it will be possible for $H_2S$ and $CO_2$ to diffuse through the liquid water in time scales less than 1 minute, more preferred less than 10 seconds to become adsorbed by the supported amine. Following the desorption step, $H_2S$ and $CO_2$ can be easily separated using fractionation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat must diffuse from the temperature control fluid to the adsorbent layer must be kept to a minimum, ideally less than 10,000 microns, more preferably less than 1000 microns, most preferably less than 200 microns.

A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimensions is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or embodiments, it is advantageous to keep the ratio of non-adsorbing thermal mass in the adsorbent bed to adsorbent as low as possible. This ratio will preferably be less than 20, more preferably less than 10, and most preferred less than 5. In this manner, the sensible heat of the system that must be swung in each cycle may be kept to a minimum.

Concept O: A relatively low flow of about 0.01 to 5% of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. It is this counter-current purge flow during desorption that ensures that on each subsequent adsorption cycle there will be no bleed-through of target species, such as $H_2S$ or $CO_2$ into the product stream.

A preferred cycle and bed design for the practice of the present invention is that the product end of the adsorbent channels, i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ will be rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this will allow more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Other embodiments include:

1. An adsorber comprising:
  a) an adsorber body;
  b) a first head engaged with said adsorber body;
  c) a first conduit extending from outside said head to at least partially through said head; and
  d) a first valve in flow communication with said first conduit controlling fluid flow along a flow path extending from the first valve and through the adsorber body.

2. The adsorber of paragraph 1 further comprising at least one of:

e) a second head engaged with said adsorber body;

f) a second conduit extending from outside the first head or the second head to at least partially through said respective head; and g) a second valve in flow communication with said second conduit controlling fluid flow along the flow path including a portion extended from the adsorber body to the second valve.

3. The adsorber of paragraph 2, wherein said first valve has a substantially open position when fluid flow in the flow path is in a first flow direction and a substantially closed position when fluid flow in the flow path is in a second, opposite flow direction.

4. The adsorber of paragraph 3 having a first valve pair on opposite sides of at least a portion of the flow path, wherein said first valve and second valve are each in a substantially open position when fluid flow in the flow path is in a first flow direction and a substantially closed position when fluid flow in the flow path is in a second, opposite flow direction.

5. The adsorber of paragraph 4 further comprising:

h) a third conduit extending from outside the first head or the second head to at least partially through said respective head;

i) a third valve in flow communication with said third conduit controlling fluid flow along the flow path including a portion extended from the adsorber body to the third valve;

j) a fourth conduit extending from outside the first head or the second head to at least partially through said respective head; and k) a fourth valve in flow communication with said second conduit controlling fluid flow along the flow path including a portion extended from the adsorber body to the fourth valve.

6. The adsorber of paragraph 5, having a second valve pair comprising said third valve and said fourth valve on opposite sides of at least a portion of the flow path, controlling flow in the second, opposite flow direction wherein the third valve and the fourth valve are each in a substantially closed position when the fluid flow in the flow path is in the first flow direction and in a substantially open position when fluid flow in the flow path is in the second, opposite flow direction.

7. The adsorber of paragraph 6, wherein the adsorber is an asymmetric reverse flow adsorber.

8. The adsorber of paragraph 6 further comprising one or more additional valves, each in flow communication with one of said first, second, third, or fourth conduits via an additional conduit extending at least partially through said additional conduit's respective head, operating in phase with any other valves in fluid communication with said additional conduit and controlling fluid flow along the flow path including a portion extended from the adsorber body to the respective valve.

9. The adsorber of paragraph 2, wherein the adsorber body comprises an adsorber bed, and the volume of the flow path consists of i) a packed flow path volume within a solids-fluids contact portion of the adsorber bed and ii) an open flow path volume between the valve(s) and the adsorber bed, as well as any open flow portion within the adsorber bed.

10. The adsorber of paragraph 9, wherein said packed flow volume comprises all volume in the adsorber bed that is at a distance less than 2 cm from a solids-fluid contact surface.

11. The adsorber of paragraph 9, wherein said solids-fluids contact portion of the adsorber bed has a wetted area greater than 0.5 cm$^2$/cm$^3$ in all regions of said portion of the adsorber bed.

12. The adsorber of paragraph 9, wherein the ratio of the open flow path volume to packed flow path volume is less than 1.

13. The adsorber of paragraph 9, wherein the ratio of the open flow path volume to packed flow path volume is less than 0.5.

14. The adsorber of paragraph 9, wherein the adsorber bed comprises a fixed bed core comprising solid material capable of heat exchange.

15. The adsorber of paragraph 9, wherein at least one of said valves is a poppet valve comprising a disk element connected to a valve stem element.

16. The adsorber of paragraph 15, wherein the poppet valve disk element has a surface substantially parallel to and facing the proximal adsorber bed surface.

17. The adsorber of paragraph 16, wherein the poppet valve opens toward the adsorber bed.

18. The adsorber of paragraph 16, wherein the poppet valve opens away from the adsorber bed.

19. The adsorber of paragraph 16, wherein the distance during operation between the poppet valve disk element flat surface in the fully open position and the adsorber bed surface is between 5% and 200% of the disk element diameter.

20. The adsorber of paragraph 16, wherein the distance during operation between the poppet valve disk element flat surface in the fully open position and the adsorber bed surface is between 20% and 80% of the disk element diameter.

21. The adsorber of paragraph 15, wherein said poppet valve stem element extends to a location outside said head.

22. The adsorber of paragraph 2, wherein each valve is associated with an externally accessible valve seat that fits within its respective inlet to the adsorber body and/or outlet from the adsorber body and is sealed to the head.

23. The adsorber of paragraph 22, wherein the valve seat is attached to the head via one of a rotatably locking mechanism, thread-in seats, and pressed-in seats.

24. The adsorber of paragraph 21, which further comprises a valve stem seal associated with the valve stem.

25. The adsorber of paragraph 24, wherein the valve stem seal is a rod packing

26. The adsorber of paragraph 15, wherein the poppet valve comprises a linearly actuatable valve stem engageable with an actuator to open and close the valve by imparting linear motion.

27. The adsorber of paragraph 26, wherein the actuator is at least one of pneumatically actuated, hydraulically actuated, and electromagnetically actuated.

28. The adsorber of paragraph 26, wherein the actuator is camshaft actuated.

29. The adsorber of paragraph 26, wherein a common actuator controls linearly aligned plural valves common to a particular fluid flow stream.

30. The adsorber of paragraph 15, wherein circular poppet valves associated with a particular head are substantially circular, uniform in diameter and spaced center-to-center by 120% to 400% of the average poppet disk element diameter.

31. The adsorber of paragraph 15, wherein circular poppet valves associated with a particular head are substantially circular, uniform in diameter and spaced center-to-center by 140% to 200% of the average poppet disk element diameter.

32. The adsorber of paragraph 15 which provides at least one of: i) a valve pressure drop as fluid flows through a valve of from 1% to 100% of the adsorber internal pressure drop; ii) a ratio of total stream poppet valve flow area for one of an inlet stream and an outlet stream to adsorber flow area ranging from 1% to 30%; iii) a poppet valve diameter between minimum value $(D_{PMIN})$[inches]=0.1484+ 0.4876*$D_B$[feet], where $D_B$ is flow area diameter in feet, and maximum value $(D_{PMAX})$[inches]=1.6113+ 1.8657*$D_B$[feet], where $D_B$ is flow area diameter in feet; iv) $L_P/D_P$, (the ratio of valve lift to poppet diameter) ranges between 3% and 25%; and v) valve lift times of at least 50 milliseconds.

33. The adsorber of paragraph 15 which provides at least one of: i) a valve pressure drop as fluid flows through a valve of from 5% to 20% of the adsorber internal pressure drop; ii) a ratio of total stream poppet valve flow area for one of an inlet stream and an outlet stream to adsorber flow area ranging from 2% to 20%; iii) a poppet valve diameter between minimum value $(D_{PMIN})$[inches]=0.1484+ 0.4876*$D_B$[feet], where $D_B$ is flow area diameter in feet, and maximum value $(D_{PMAX})$[inches]=1.6113+ 1.8657*$D_B$[feet], where $D_B$ is flow area diameter in feet; iv) $L_P/D_P$, (the ratio of valve lift to poppet diameter) ranges between 5% and 20%; and v) valve lift times between 100 and 500 milliseconds.

34. An adsorber comprising:
   a) an adsorber body partially enclosing an adsorption and/or heat exchange region comprising two substantially opposing open ends;
   b) a first head capping one end of the adsorber body;
   c) a second head capping the opposing end of the adsorber body;
   d) a fixed bed comprising a region proximal to the first head, a region proximal to the second head and a central region disposed therebetween, which fixed bed is disposed within the adsorber body and comprises solid material capable of promoting adsorption and/or heat exchange with a gas stream;
   e) at least one gas stream inlet associated with the first head opening a pathway through the first head and into the adsorber body and at least one gas stream outlet associated with the second head opening a pathway from the adsorber body and through the second head;
   f) at least one inlet poppet valve controlling the gas stream inlet and integrated with the head associated with the inlet, the inlet poppet valve comprising a linearly actuatable valve stem;
   g) at least one outlet poppet valve controlling the gas stream outlet and integrated with the head associated with the outlet, the outlet poppet valve comprising a linearly actuatable valve stem; and
   h) at least one actuator engageable with the linearly actuatable valve stem of f) and/or g) providing valve opening and closing by imparting linear motion to the poppet valve to allow gases to pass from outside the adsorber to inside the adsorber body, and from inside the adsorber body to outside the adsorber so as to provide changeable flow operation.

35. The adsorber of paragraph 34 which further comprises i) at least one gas stream inlet associated with the second head opening a pathway through the second head and the adsorber body and at least one gas stream outlet associated with the first head opening a pathway through the adsorber body and the first head, with associated inlet poppet valve(s) or other inlet flow control means, outlet poppet valve(s) and actuator(s) analogous to f), g) and h).

36. A process for rapid stream-switching of at least two streams in a reverse-flow adsorber comprising an adsorber body partially enclosing an adsorption and/or heat exchange region comprising two substantially opposing open ends with a first head capping one end of the adsorber body, a second head capping the opposing end of the adsorber body, a fixed bed disposed within the adsorber body comprising solid material capable of promoting adsorption and/or heat exchange with a gas stream, which comprises:
   i) introducing from one or more inlet gas sources at least one first gas stream to at least one gas stream inlet associated with the first head through the first head and into the adsorber body and withdrawing a treated first gas stream from the adsorber body and through the second head to at least one gas stream outlet associated with the second head; wherein said introducing and withdrawing are controlled respectively by at least one intake poppet valve located in the first head and at least one exhaust poppet valve located in the second head; and
   ii) introducing from one or more inlet gas sources at least one second gas stream to at least one gas stream inlet associated with the second head through the second head and into the adsorber body and withdrawing a treated second gas stream from the adsorber body and through the first head to at least one gas stream outlet associated with the first head, wherein said introducing and withdrawing are controlled respectively by at least one intake poppet valve or other intake flow control means located in the second head and at least one exhaust poppet valve located in the first head.

37. An adsorber comprising:
   a) an adsorber body, wherein the adsorber body forms an adsorption zone within the adsorber body;
   b) a packing material disposed within the adsorption zone;
   c) one or more poppet valve assemblies coupled to the adsorber body and in flow communication with the adsorption zone and controlling fluid flow between a location external to the adsorber body and within the adsorption zone.

38. The adsorber of paragraph 37, wherein the adsorber body comprises a head and a shell coupled together to form the adsorption zone; and wherein the one or more poppet valve assembly are coupled to the head.

39. The adsorber of paragraph 38, wherein the one or more poppet valve assemblies comprise:
   i) a first conduit extending from outside the head to at least partially through the head; and
   ii) a first valve in flow communication with the first conduit controlling fluid flow along a flow path extending from the first valve and through the adsorber body.

40. The adsorber of paragraph 39, wherein the first valve has a substantially open position when fluid flow in the flow path is in a first flow direction and a substantially closed position when fluid flow in the flow path is in a second, opposite flow direction.

41. A computing device, comprising:
   a processor;
   a memory coupled to the processor; and
   instructions provided to the memory, wherein the instructions are executable by the processor to:
      generate model results based on one or more poppet valve assemblies coupled to an adsorber body and in flow communication with a adsorption zone, wherein the one or more poppet valve assemblies control fluid flow between a location external to the adsorber body and within the adsorption zone;
      store the model results.

42. The computing device of paragraph 41, wherein the model results are based on spacing of the one or more poppet valve assemblies coupled to an adsorber body.

43. The adsorber of paragraph 37, wherein the adsorber is an asymmetric reverse flow adsorber.

44. The adsorber of paragraph 37, wherein the packing material is a honeycomb packing material.

45 The adsorber of any of preceding paragraphs 1-44, wherein the adsorber includes one or more features as shown in the Figures attached hereto.

Other embodiments may include:

1A. An adsorber comprising:
   a) an adsorber body;
   b) a first head engaged with said adsorber body;
   c) a first conduit extending from outside said head to at least partially through said head; and
   d) a first valve in flow communication with said first conduit controlling fluid flow along a flow path extending from the first valve and through the adsorber body.

2A. The adsorber of paragraph 2A further comprising at least one of:
   e) a second head engaged with said adsorber body;
   f) a second conduit extending from outside the first head or the second head to at least partially through said respective head; and
   g) a second valve in flow communication with said second conduit controlling fluid flow along the flow path including a portion extended from the adsorber body to the second valve.

3A. The adsorber of any of the preceding paragraphs, wherein said first valve has a substantially open position when fluid flow in the flow path is in a first flow direction and a substantially closed position when fluid flow in the flow path is in a second, opposite flow direction.

4A. The adsorber of any of the preceding paragraphs 2A to 3A, having a first valve pair on opposite sides of at least a portion of the flow path, wherein said first valve and second valve are each in a substantially open position when fluid flow in the flow path is in a first flow direction and a substantially closed position when fluid flow in the flow path is in a second, opposite flow direction.

5A. The adsorber of any of the preceding paragraphs 2A to 4A further comprising: h) a third conduit extending from outside the first head or the second head to at least partially through said respective head; i) a third valve in flow communication with said third conduit controlling fluid flow along the flow path including a portion extended from the adsorber body to the third valve; j) a fourth conduit extending from outside the first head or the second head to at least partially through said respective head; and k) a fourth valve in flow communication with said second conduit controlling fluid flow along the flow path including a portion extended from the adsorber body to the fourth valve.

6A. The adsorber of paragraph 5A, having a second valve pair comprising said third valve and said fourth valve on opposite sides of at least a portion of the flow path, controlling flow in the second, opposite flow direction wherein the third valve and the fourth valve are each in a substantially closed position when the fluid flow in the flow path is in the first flow direction and in a substantially open position when fluid flow in the flow path is in the second, opposite flow direction.

7A. The adsorber of any of the preceding paragraphs, wherein the adsorber is an asymmetric reverse flow adsorber.

8A. The adsorber of any of the preceding paragraphs 5A and 6A, further comprising one or more additional valves, each in flow communication with one of said first, second, third, or fourth conduits via an additional conduit extending at least partially through said additional conduit's respective head, operating in phase with any other valves in fluid communication with said additional conduit and controlling fluid flow along the flow path including a portion extended from the adsorber body to the respective valve.

9A. The adsorber of any of the preceding paragraphs, wherein the adsorber body comprises an adsorber bed, and the volume of the flow path consists of i) a packed flow path volume within a solids-fluids contact portion of the adsorber bed and ii) an open flow path volume between the valve(s) and the adsorber bed, as well as any open flow portion within the adsorber bed.

10A. The adsorber of paragraph 9A, wherein said packed flow volume comprises all volume in the adsorber bed that is at a distance less than 2 cm from a solids-fluid contact surface.

11A. The adsorber of paragraph 9A, wherein said solids-fluids contact portion of the adsorber bed has a wetted area greater than $0.5 \text{ cm}^2/\text{cm}^3$ in all regions of said portion of the adsorber bed.

12A. The adsorber of paragraph 9A, wherein the ratio of the open flow path volume to packed flow path volume is less than 1.

13A. The adsorber of paragraph 9A, wherein the ratio of the open flow path volume to packed flow path volume is less than 0.5.

14A. The adsorber of paragraph 9A, wherein the adsorber bed comprises a fixed bed core comprising solid material capable of heat exchange.

15A. The adsorber of paragraph 9A, wherein at least one of said valves is a poppet valve comprising a disk element connected to a valve stem element.

16A. The adsorber of paragraph 15A, wherein the poppet valve disk element has a surface substantially parallel to and facing the proximal adsorber bed surface.

17A. The adsorber of paragraph 15A or 16A, wherein the poppet valve opens toward the adsorber bed.

18A. The adsorber of paragraph 15A or 16A, wherein the poppet valve opens away from the adsorber bed.

19A. The adsorber of paragraphs 15A, 16A, 17A, or 18A, wherein the distance during operation between the poppet valve disk element flat surface in the fully open position and the adsorber bed surface is between 5% and 200% of the disk element diameter.

20A. The adsorber of paragraphs 15A, 16A, 17A, or 18A, wherein the distance during operation between the poppet valve disk element flat surface in the fully open position and the adsorber bed surface is between 20% and 80% of the disk element diameter.

21A. The adsorber of paragraphs 15A, 16A, 17A, or 18A, wherein said poppet valve stem element extends to a location outside said head.

22A. The adsorber of any of the preceding paragraphs, wherein each valve is associated with an externally accessible valve seat that fits within its respective inlet to the adsorber body and/or outlet from the adsorber body and is sealed to the head.

23A. The adsorber of paragraph 22A, wherein the valve seat is attached to the head via one of a rotatable locking mechanism, thread-in seats, and pressed-in seats.

24A. The adsorber of paragraph 21A, which further comprises a valve stem seal associated with the valve stem.

25A. The adsorber of paragraph 24A, wherein the valve stem seal is a rod packing 26A. The adsorber of paragraph 15A, wherein the poppet valve comprises a linearly actuatable valve stem engageable with an actuator to open and close the valve by imparting linear motion.

27A. The adsorber of paragraph 26A, wherein the actuator is at least one of pneumatically actuated, hydraulically actuated, and electromagnetically actuated.

28A. The adsorber of paragraph 26A, wherein the actuator is camshaft actuated.

29A. The adsorber of paragraph 26A, wherein a common actuator controls linearly aligned plural valves common to a particular fluid flow stream.

30A. The adsorber of paragraph 15A, wherein circular poppet valves associated with a particular head are substantially circular, uniform in diameter and spaced center-to-center by 120% to 400% of the average poppet disk element diameter.

31A. The adsorber of paragraph 15A, wherein circular poppet valves associated with a particular head are substantially circular, uniform in diameter and spaced center-to-center by 140% to 200% of the average poppet disk element diameter.

32A. The adsorber of paragraph 15A which provides at least one of: i) a valve pressure drop as fluid flows through a valve of from 1% to 100% of the adsorber internal pressure drop; ii) a ratio of total stream poppet valve flow area for one of an inlet stream and an outlet stream to adsorber flow area ranging from 1% to 30%; iii) a poppet valve diameter between minimum value $(D_{PMIN})$[inches]=0.1484+0.4876*$D_B$[feet], where $D_B$ is flow area diameter in feet, and maximum value $(D_{PMAX})$[inches]=1.6113+1.8657*$D_B$[feet], where $D_B$ is flow area diameter in feet; iv) $L_P/D_P$, (the ratio of valve lift to poppet diameter) ranges between 3% and 25%; and v) valve lift times of at least 50 milliseconds.

33A. The adsorber of paragraph 15A which provides at least one of: i) a valve pressure drop as fluid flows through a valve of from 5% to 20% of the adsorber internal pressure drop; ii) a ratio of total stream poppet valve flow area for one of an inlet stream and an outlet stream to adsorber flow area ranging from 2% to 20%; iii) a poppet valve diameter between minimum value $(D_{PMIN})$[inches]=0.1484+0.4876*$D_B$[feet], where $D_B$ is flow area diameter in feet, and maximum value $(D_{PMAX})$[inches]=1.6113+1.8657*$D_B$[feet], where $D_B$ is flow area diameter in feet; iv) $L_P/D_P$, (the ratio of valve lift to poppet diameter) ranges between 5% and 20%; and v) valve lift times between 100 and 500 milliseconds.

34A. The adsorber of any of the preceding paragraphs which is an adsorber used for pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/ temperature swing adsorption.

41A. An adsorber comprising:
a) an adsorber body, wherein the adsorber body forms an adsorption zone within the adsorber body;
b) a packing material disposed within the adsorption zone;
c) one or more poppet valve assemblies coupled to the adsorber body and in flow communication with the adsorption zone and controlling fluid flow between a location external to the adsorber body and within the adsorption zone.

42A. The adsorber of paragraph 41A, wherein the adsorber body comprises a head and a shell coupled together to form the adsorption zone; and wherein the one or more poppet valve assembly are coupled to the head.

43A. The adsorber of paragraph 42A, wherein the one or more poppet valve assemblies comprise:
i) a first conduit extending from outside the head to at least partially through the head; and
ii) a first valve in flow communication with the first conduit controlling fluid flow along a flow path extending from the first valve and through the adsorber body.

44A. The adsorber of paragraph 43A, wherein the first valve has a substantially open position when fluid flow in the flow path is in a first flow direction and a substantially closed position when fluid flow in the flow path is in a second, opposite flow direction.

45A. A computing device, comprising:
a processor;
a memory coupled to the processor; and
instructions provided to the memory, wherein the instructions are executable by the processor to:
generate model results based on at least spacing between one or more poppet valve assemblies coupled to an adsorber body and in flow communication with a adsorption zone, wherein the one or more poppet valve control fluid flow between a location external to the adsorber body and within the adsorption zone;
store the model results.

46A. The computing device of paragraph 45A, wherein the model results are based on spacing of the one or more poppet valve assemblies coupled to an adsorber body.

47A. The adsorber of paragraph 41A, wherein the adsorber is an asymmetric reverse flow adsorber.

48A. The adsorber of paragraph 41A, wherein the packing material is a honeycomb packing material.

49A. The adsorber of paragraph 37A, wherein the acetylene is converted to ethylene.

50A. The adsorber of any of preceding paragraphs 1A-49A, wherein the adsorber includes one or more features as shown in the Figures attached hereto.

As may be appreciated, in an alternative embodiment, the adsorber of any of paragraphs 1-15 or 1A-15A may provide at least one of: i) a valve pressure drop as fluid flows through a valve of from 5% to 20% of the adsorber internal pressure drop; ii) a ratio of total stream poppet valve flow area for one of an inlet stream and an outlet stream to adsorber flow area ranging from 2% to 20%; iii) a poppet valve diameter between minimum value (DPMIN) [inches]=0.1484+0.4876*DB [feet], where DB is flow area diameter in feet, and maximum value (DPMAX) [inches]=1.6113+2.858*DB [feet], where DB is flow area diameter in feet; iv) LP/DP, (the ratio of valve lift to poppet diameter) ranges between 5% and 20%; and v) valve lift times between 100 and 500 milliseconds.

Although the invention has been described in detail herein, the skilled practitioner will recognize other embodiments of the invention that are within the scope of the claims.

What is claimed is:
1. An adsorber comprising:
a) an adsorber body, wherein the adsorber is a temperature swing adsorption apparatus or pressure swing adsorption apparatus and an adsorber bed is disposed within the adsorber body;
b) a first head engaged with said adsorber body;
c) a first conduit extending from outside said head to at least partially through said head; and
d) a plurality of valves, wherein the plurality of valves comprise a first valve in flow communication with said first conduit controlling fluid flow along a flow path extending from the first valve and through the adsorber body, wherein at least one of said plurality of valves is a poppet valve comprising a disk element connected to a valve stem element and wherein the distance during operation between a poppet valve disk element flat surface in the fully open position and an adsorber bed surface is between 5% and 200% of the disk element diameter.

2. The adsorber of claim 1, wherein said first valve has a substantially open position when fluid flow in the flow path is in a first flow direction and a substantially closed position when fluid flow in the flow path is in a second, opposite flow direction.

3. The adsorber of claim 2 having a first valve pair on opposite sides of at least a portion of the flow path, wherein said first valve and second valve are each in a substantially open position when fluid flow in the flow path is in a first flow direction and a substantially closed position when fluid flow in the flow path is in a second, opposite flow direction.

4. The adsorber of claim 1, wherein the poppet valve opens toward the adsorber bed.

5. The adsorber of claim 1, wherein the poppet valve opens away from the adsorber bed.

6. The adsorber of claim 1, wherein each valve is associated with an externally accessible valve seat that fits within its respective inlet to the adsorber body and/or outlet from the adsorber body and is sealed to the head.

7. The adsorber of claim 6, wherein the valve seat is attached to the head via one of a rotatable locking mechanism, thread-in seats, and pressed-in seats.

8. The adsorber of claim 1 which further comprises a valve stem seal associated with the valve stem.

9. The adsorber of claim 8, wherein the valve stem seal is a reciprocating compressor-type seal.

10. The adsorber of claim 1, wherein the poppet valve comprises a linearly actuatable valve stem engageable with an actuator to open and close the valve by imparting linear motion.

11. The adsorber of claim 10, wherein the actuator is at least one of pneumatically actuated, hydraulically actuated, and electromagnetically actuated.

12. The adsorber of claim 10, wherein the actuator is camshaft actuated.

13. The adsorber of claim 10, wherein a common actuator controls linearly aligned plural valves common to a particular fluid flow stream.

14. The adsorber of claim 10, wherein said valves associated with said head are substantially circular, uniform in diameter and spaced center-to-center by 120% to 400% of the average poppet disk element diameter.

15. An adsorber comprising:
a) an adsorber body partially enclosing an adsorptive region comprising two substantially opposing open ends;
b) a first head capping one end of the adsorber body;
c) a second head capping the opposing end of the adsorber body;
d) a fixed bed comprising a region proximal to the first head, a region proximal to the second head and a central region disposed therebetween, which fixed bed is disposed within the adsorber body and comprises solid material capable of promoting adsorption of one or more components of a gas stream;
e) at least one gas stream inlet associated with the first head opening a pathway through the first head and into the adsorber body and at least one gas stream outlet associated with the second head opening a pathway from the adsorber body and through the second head;
f) at least one inlet poppet valve controlling the gas stream inlet and integrated with the head associated with the inlet, the inlet poppet valve comprising a linearly actuatable valve stem;
g) at least one outlet poppet valve controlling the gas stream outlet and integrated with the head associated with the outlet, the outlet poppet valve comprising a linearly actuatable valve stem; and
h) at least one actuator engageable with the linearly actuatable valve stem of f) and/or g) providing valve opening and closing by imparting linear motion to the poppet valve to allow gases to pass from outside the adsorber to inside the adsorber body, and from inside the adsorber body to outside the adsorber so as to provide changeable flow operation.

16. The adsorber of claim 15 which further comprises i) at least one secondary gas stream inlet associated with the second head opening a pathway through the second head and the adsorber body and at least one secondary gas stream outlet associated with the first head opening a pathway through the adsorber body and the first head, with associated inlet poppet valve(s) or other inlet flow control means, outlet poppet valve(s) and actuator(s) analogous to f), g) and h).

* * * * *